United States Patent
Kang et al.

(10) Patent No.: US 7,463,874 B2
(45) Date of Patent: Dec. 9, 2008

(54) COMPLEX DIGITAL SIGNAL CHANNEL SELECT FILTER FOR ANALOG CABLE TELEVISION

(75) Inventors: David Dukho Kang, Fullerton, CA (US); Chun-Huat Heng, Singapore (SG)

(73) Assignee: Chrontel, Inc., San Jose, CA (US)

( * ) Notice: Subject to any disclaimer, the term of this patent is extended or adjusted under 35 U.S.C. 154(b) by 827 days.

(21) Appl. No.: 10/968,551

(22) Filed: Oct. 18, 2004

(65) Prior Publication Data

US 2005/0090219 A1   Apr. 28, 2005

Related U.S. Application Data

(63) Continuation-in-part of application No. 10/836,545, filed on Apr. 30, 2004.

(60) Provisional application No. 60/514,215, filed on Oct. 23, 2003.

(51) Int. Cl.
 *H04B 1/18* (2006.01)
(52) U.S. Cl. .................. 455/285; 455/213
(58) Field of Classification Search ................ 455/285, 455/302, 213, 306, 307, 339
See application file for complete search history.

(56) References Cited

U.S. PATENT DOCUMENTS

| | | | |
|---|---|---|---|
| 5,737,035 A | 4/1998 | Rotzoll | |
| 6,177,964 B1 | 1/2001 | Birleson et al. | |
| 6,377,315 B1 | 4/2002 | Carr et al. | |
| 6,892,060 B2 * | 5/2005 | Zheng | 455/302 |
| 7,098,967 B2 | 8/2006 | Kanno et al. | |
| 2003/0162521 A1 | 8/2003 | Vorenkamp et al. | |
| 2006/0189290 A1 * | 8/2006 | Olson | 455/285 |

\* cited by examiner

*Primary Examiner*—Tu X Nguyen
(74) *Attorney, Agent, or Firm*—Carr & Ferrell LLP

(57) ABSTRACT

A fully-integrated tuner for performing signal channel selection and image rejection in an analog cable television system is provided. Various embodiments disclose a tuner including an analog RF section to process an analog RF input signal and generate complex low intermediate frequency digital signals, and a signal processing section configured to reduce image and signal leakage in the complex low intermediate frequency signals. The signal processing section selects a signal channel of the complex low intermediate frequency signals and suppresses channel components adjacent to the signal channel. In one embodiment, the signal processing section includes a complex digital signal channel select filter to select the signal channel and suppress the adjacent channel components. In other embodiments, the complex digital signal channel select filter selects the signal channel, shapes the selected signal channel to generate a shaped signal channel, and equalizes a group delay of the shaped signal channel.

17 Claims, 17 Drawing Sheets

COMPLEX DIGITAL SIGNAL CHANNEL SELECT FILTER FOR ANALOG CABLE TELEVISION

CROSS-REFERENCE TO RELATED APPLICATION

This application is a continuation-in-part of U.S. patent application Ser. No. 10/836,545 entitled "A Tuner and Demodulator for Analog Cable Television," filed on Apr. 30, 2004, which claims the benefit of U.S. Provisional Patent Application Ser. No. 60/514,215 entitled "A Tuner and Demodulator for Analog Cable Television," filed on Oct. 23, 2003. Each of these patent applications is hereby incorporated by reference.

BACKGROUND OF THE INVENTION

1. Field of the Invention

The present invention relates generally to systems and methods for tuning and demodulating radio frequency (RF) signals, and more particularly, to a tuner providing complex digital signal channel selection and image rejection.

2. Description of Related Art

Analog cable television (also known as "CATV") brings television programs to millions of viewers throughout the world. Analog cable television is transmitted using a radio frequency (RF) signal that comprises several channels or bands of signals. In order to effectively present a channel to a viewer, an electronic device, such as a tuner, is used to separate and process one channel for presentation.

Tuners may be fabricated on circuit boards and then installed in computer systems, thereby allowing the computer system to operate as a television set. Many tuners convert high frequency RF signals to one or more Intermediate Frequency (IF) signals which, at a later step, are converted to baseband signals. Such IF signals are at a lower frequency than the RF signals. Each translation stage normally uses mixing to produce both a desired signal and an image signal. If the image signal falls into the same IF frequency band as the desired signal, the image signal should be removed from the desired signal. This process of correcting the desired signal by removing the image signal is referred to as image rejection.

FIG. 1 is a prior art block diagram of a conventional tuner 100 for analog cable television. The conventional tuner 100 includes a mixer 105, a surface acoustic wave (SAW) filter 110, a local oscillator 115, an image rejection mixer 120, and a real analog signal channel select filter 125. In operation, the mixer 105 combines an RF signal (comprised of image and signal components) with a first oscillator signal 130 received from the local oscillator 115 to generate a high intermediate frequency (IF) signal 135 of approximately 1.0 GHz. The high IF signal 135 is sent to the SAW filter 110 for image rejection processing. Typically, the SAW filter 110 suppresses the image component of the high IF signal 135 by approximately 30 dB. The SAW filter 110 is typically located off-chip (i.e., not integrated on-chip with other components of the conventional tuner 100), since the SAW filter 110 is configured as a high-Q filter for processing the high IF signal 135. The filtered high IF signal 140 is split and sent to mixers 145A and 145B of the image rejection mixer 120. The image rejection mixer 120 also comprises ninety-degree phase delay modules 150A and 150B and a summer 155. In operation, the image rejection mixer 120 down-converts the filtered high IF signal 140 and provides an additional 30 dB of image rejection to generate a low IF signal 160. Ideally, the conventional tuner 100 receives the RF signal with image and signal components, filters the image component off-chip, generates a low IF signal 160 comprised of a signal component and a small or nonexistent image component, and transmits the low IF signal 160 to the real analog signal channel select filter 125.

FIG. 2A is a prior art plot of spectral amplitude S(f) of the low IF signal 160 illustrated in FIG. 1. The dotted line represents an image component 205 of the RF signal that has been suppressed or removed from the RF signal spectrum by the SAW filter 110 (FIG. 1) and the image rejection mixer 120 (FIG. 1). In other words, the conventional tuner 100 generates the low IF signal 160 comprised of a signal component 210 only. Since the image component 205 is removed from the RF signal, the real analog signal channel select filter 125 (FIG. 1) is typically configured as a real filter to select an appropriate signal channel (and a corresponding non-existent image channel) from the low IF signal 160. As is known in the art, pairs of poles in the complex frequency plane define a real filter, where a first pole of a pair of poles is a complex conjugate of a second pole of the pair of poles.

FIG. 2B illustrates a prior art frequency response A(f) (i.e., magnitude of a transfer function) of the real analog signal channel select filter 125 of FIG. 1. As is known to one skilled in the art, the real analog signal channel select filter 125 passes (i.e., selects) pairs of positive and negative frequency bandwidths, such as a negative frequency bandwidth 215 and a positive frequency bandwidth 220. However, since the image component 205 (FIG. 2A) of the low IF signal 160 (FIG. 1) received by the real analog signal channel select filter 125 is suppressed, the filter 125 only passes a portion of the signal component 210 (FIG. 2A) that lies within both the positive and negative frequency bandwidth 220. Real signal channel select filters of the prior art are typically implemented as external (i.e., off-chip) SAW filters.

Conventional tuners typically provide approximately 60 dB image rejection and signal channel selection by using integrated tuner components and off-chip fixed filters, such as external SAW filters. Such off-chip filters require additional pins and interface components, thus increasing power consumption, packaging costs, and placing electrical and physical design constraints on other tuner components. Some conventional tuners have been configured with on-chip analog filters to perform image rejection; however, such tuners require costly and complicated circuitry to provide desired signal accuracy. There exists a need for a fully integrated analog cable television tuner that provides image rejection and digital signal channel selection.

SUMMARY OF THE INVENTION

The present invention provides a system and method for selecting a signal channel in a digital signal and rejecting an image signal in the digital signal channel. In one embodiment of the invention, the system comprises an analog RF section integrated with a signal processing section for processing an analog RF input signal. The analog RF section is configured to receive the analog RF input signal and generate a first low IF digital signal and a second low IF digital signal. In accordance with the present invention, the first low IF digital signal is comprised primarily of a signal component and an image leakage, and the second low IF digital signal is comprised primarily of an image component and a signal leakage.

In one embodiment, the signal processing section comprises a complex least-mean-square (LMS) image rejection module configured to receive the first and second low IF digital signals, reduce the image leakage in the first low IF digital signal, and reduce the signal leakage in the second low IF digital signal. In this embodiment, the signal processing section comprises a complex digital signal channel select filter configured to select a signal channel of the first low IF digital signal and suppress channel components adjacent to the signal channel.

According to another embodiment, the present invention provides a method for selecting a signal channel in a radio frequency signal. The method includes processing an analog RF input signal to generate a first low IF digital signal and a second low IF digital signal. The first low IF digital signal substantially comprises a signal component and an image leakage. The second low IF digital signal substantially comprises an image component and a signal leakage. The image leakage is reduced in the first low IF digital signal and the signal leakage is reduced in the second low IF digital signal. The first low IF digital signal is then filtered to select a signal channel in the first low IF digital signal and suppress channel components adjacent to the selected signal channel.

DETAILED DESCRIPTION OF THE INVENTION

Various embodiments of the invention provide systems and methods for tuning and demodulating radio frequency signals, and more particularly, provide an integrated tuner for signal channel selection and image rejection.

Figure 1:
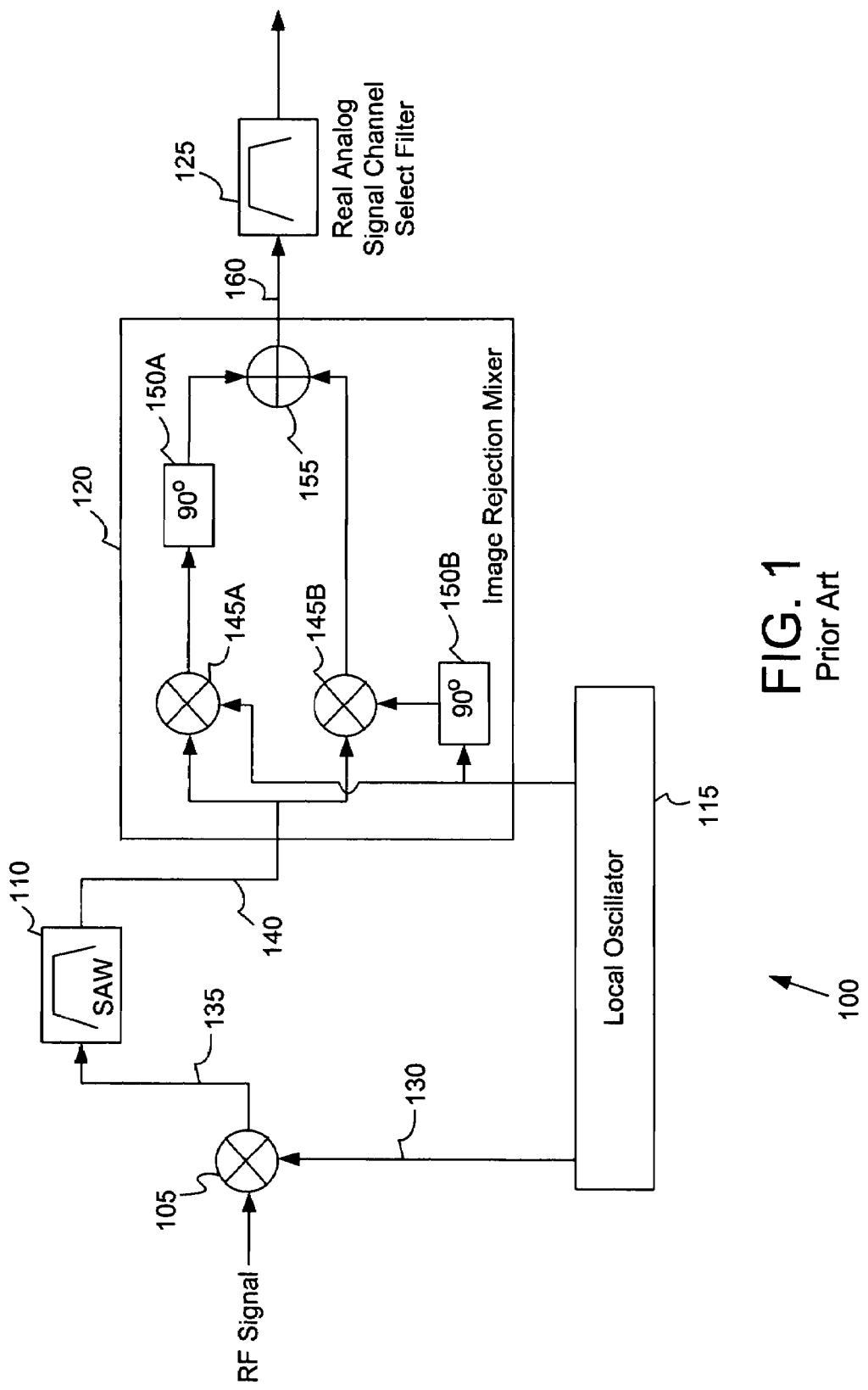
FIG. 1 illustrates a prior art block diagram of a conventional tuner for analog cable television.
Figure 2A:
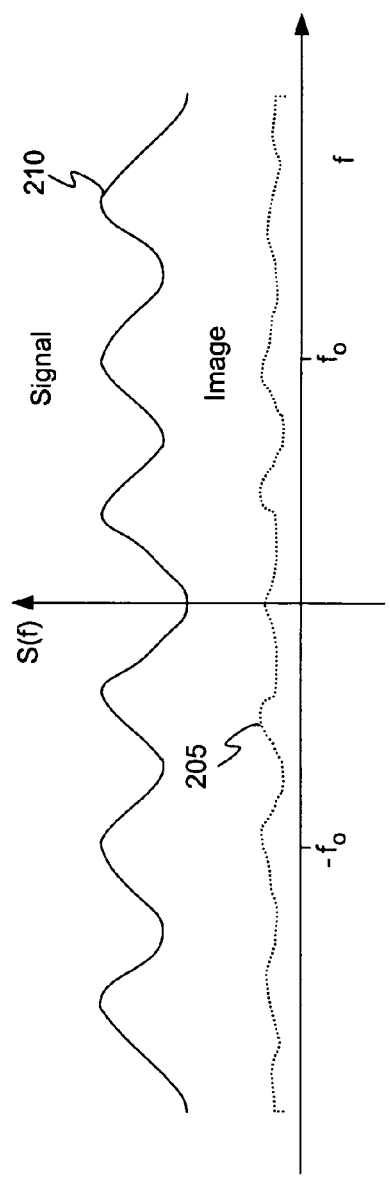
FIG. 2A is a prior art plot of spectral amplitude S(f) of the low IF signal illustrated in FIG. 1.
Figure 2B:
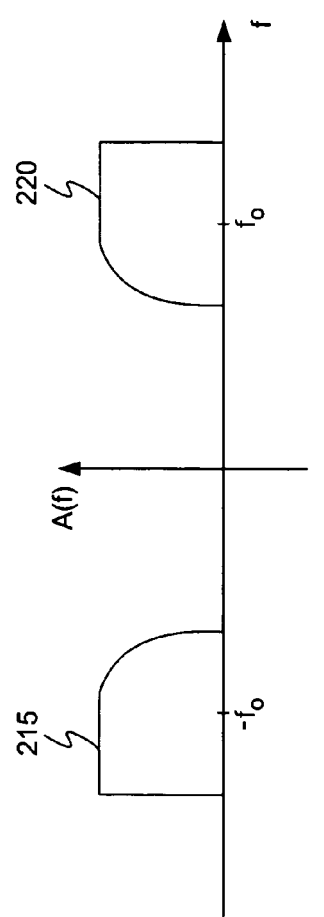
FIG. 2B illustrates a prior art frequency response A(f) of the real analog signal channel select filter of FIG. 1.
Figure 3A:
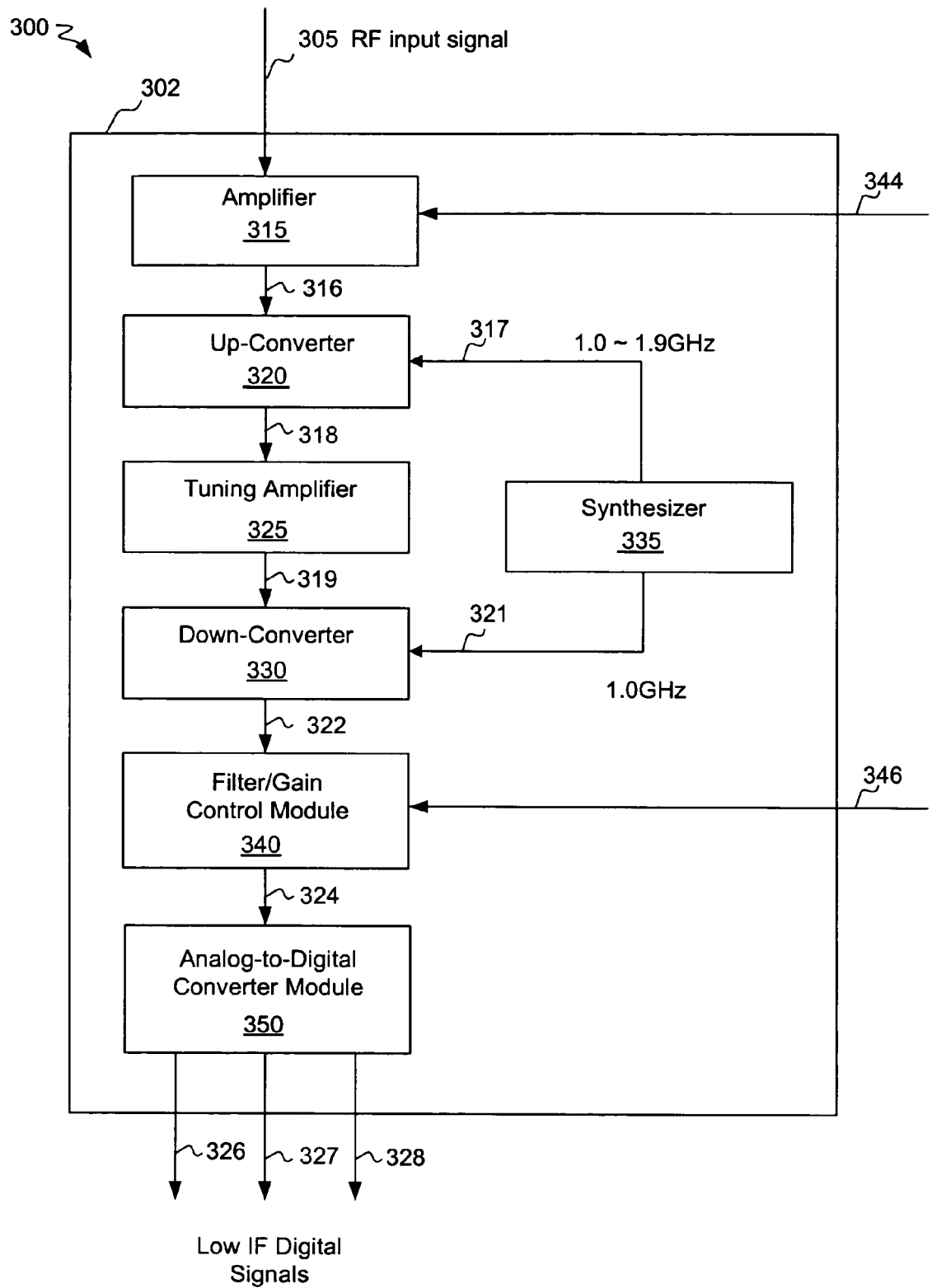
FIG. 3A illustrates a high-level overview diagram of an analog RF section of a tuner for analog cable television, according to one embodiment of the present invention.
Figure 3B:
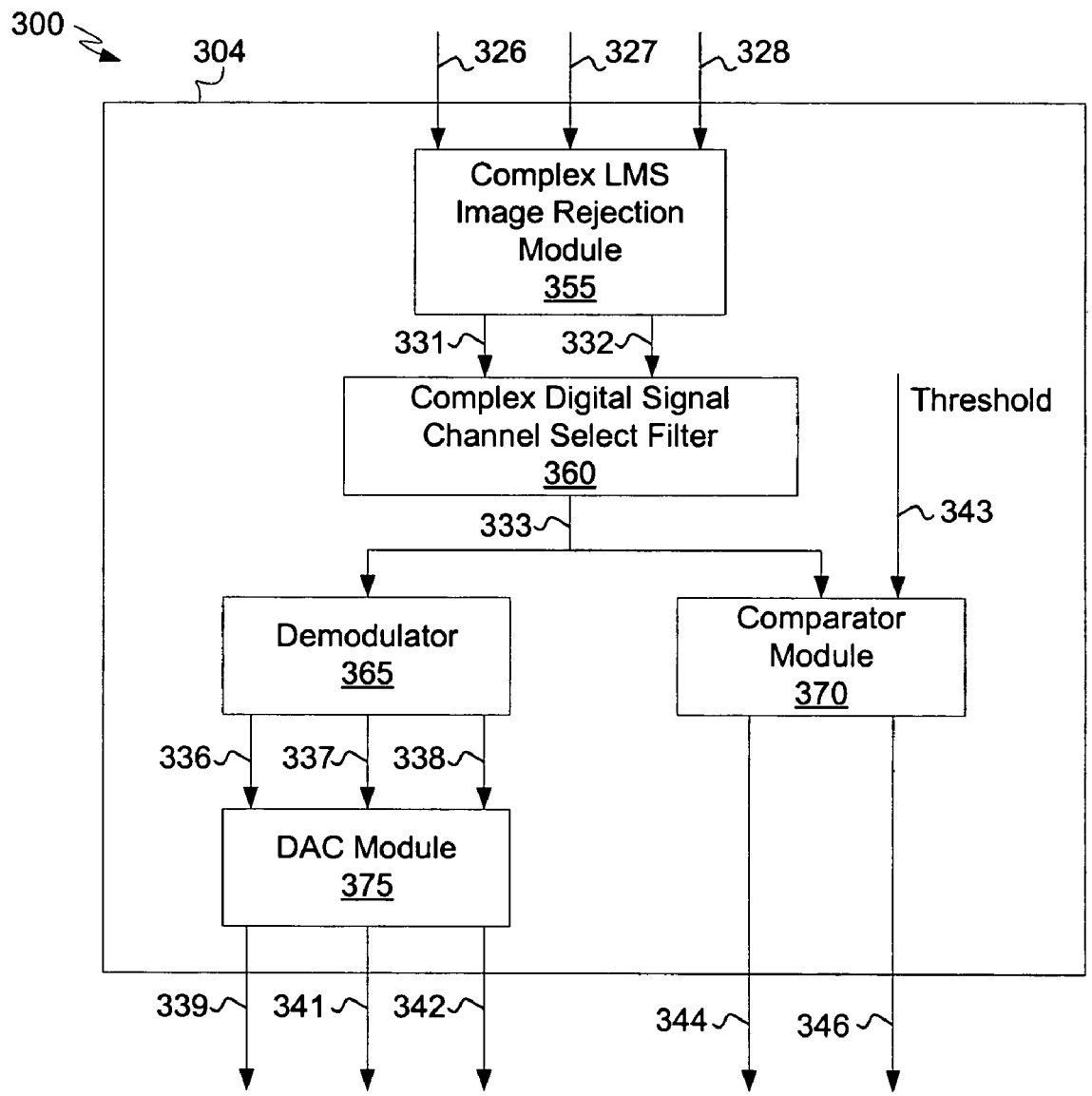
FIG. 3B illustrates a high-level overview diagram of a signal processing section of a tuner for analog cable television, according to one embodiment of the present invention.

FIGS. 3A and 3B illustrate high-level overview diagrams of a tuner 300 comprising an analog RF section 302 (FIG. 3A) and a signal processing section 304 (FIG. 3B), according to an embodiment of the invention. In the preferred embodiment, the tuner 300 is constructed on a single integrated chip. An integrated circuit (not shown) comprising the tuner 300 may be constructed with 0.25 µm RF Complementary Metal Oxide Semiconductor (CMOS) components consuming approximately 1 W and operating on a 6 mm×6 mm die. The tuner 300 comprises an amplifier 315, an up-converter 320, a tuning amplifier 325, a down-converter 330, a synthesizer 335, a filter/gain control module 340, an analog-to-digital converter module 350, a complex LMS image rejection module 355, a complex digital signal channel select filter 360, a demodulator 365, a comparator module 370, and a digital-to-analog converter (DAC) module 375.

FIG. 3A illustrates the analog RF section 302 of the tuner 300. As illustrated in FIG. 3A, the amplifier 315 receives an RF input signal 305. The amplifier 315 amplifies the RF input signal 305 and transmits an amplified signal 316 to the up-converter 320. The amplifier 315 preferably comprises a variable gain low noise amplifier, configured to maintain constant peak amplitude for the signal. In one embodiment of the invention, the amplifier 315 is a common source amplifier utilizing three controls for managing the gain. A first control adjusts the gain as a function of amplifier linearity. Typically, reducing the gain increases amplifier linearity. A second control varies a load resistor (not shown) of amplifier 315. Thus, the first control and the second control in combination preferably provide a coarse gain adjustment. A third control provides a fine gain adjustment by adjusting a current flow through the load resistor (not shown). In a preferred embodiment, the gain is adjusted in 0.85 dB increments.

The up-converter 320 receives the amplified signal 316 from the amplifier 315 and a first synthesized signal 317 from the synthesizer 335. The up-converter 320 comprises any device capable of increasing the frequency of a signal. In the preferred embodiment, the up-converter 320 changes the frequency of the amplified signal 316 to approximately 1.0 GHz, resulting in an intermediate frequency (IF) signal 318. According to the preferred embodiment of the invention, the up-converter 320 (or "up-mixer") comprises a conventional Gilbert four-quadrant multiplier. A Gilbert four-quadrant multiplier configured with bipolar junction transistors is disclosed by Barrie Gilbert, "A Precise Four-Quadrant Multiplier with Subnanosecond Response," IEEE Journal of Solid State Circuits, Vol. SC-3, pp. 365-373, December 1968, which is incorporated herein by reference. As known to one skilled in the art, the Gilbert four-quadrant multiplier may be implemented with Metal Oxide Substrate (MOS) or bipolar transistors. The up-converter 320 may employ a tuning inductor coupled to an output of the Gilbert four-quadrant multiplier to advantageously suppress harmonics in the generated IF signal 318. The up-converter 320 transmits the IF signal 318 to the tuning amplifier 325.

As illustrated in FIG. 3A, the tuning amplifier 325 receives the IF signal 318 from the up-converter 320. The tuning amplifier 325 preferably comprises any device capable of suppressing harmonics resulting from mixing. The tuning amplifier 325 suppresses the harmonics of the IF signal 318 and transmits a resulting signal 319 to the down-converter 330. In one embodiment, the up-converter 320 and the tuning amplifier 325 are configured to provide a collective gain of 6 dB. The down-converter 330 receives the resulting signal 319 from the tuning amplifier 325 and a second synthesized signal 321 from the synthesizer 335. The down-converter 330 changes the frequency of the resulting signal 319 received from the tuning amplifier 325 to approximately 1.75 MHz, resulting in a complex IF signal 322 (i.e., a complex low IF signal). According to a preferred embodiment of the invention, the down-converter 330 (or "down-mixer") comprises two stages. A first stage may be a conventional Gilbert four-quadrant multiplier similar to the four-quadrant multiplier that is described in reference to the up-converter 320. In one embodiment, the first stage further comprises an active current source coupled across first stage output nodes as a load. Using the active current source advantageously enables the down-converter 330 to handle large currents with reduced or minimal voltage drops. A second stage may comprise a conventional trans-impedance amplifier, wherein a gain is mainly set by a feedback resistor, as is known to one skilled in the art. In one embodiment, the down-converter 330 is configured to provide a gain of 16 dB. The down-converter 330 transmits the complex IF signal 322 to the filter/gain control module 340. In one embodiment, the synthesizer 335 is configured to generate the first synthesized signal 317 with a frequency of approximately 1.0 GHz to 1.9 GHz (one octave) and the second synthesized signal 321 with a frequency of approximately 1.0 GHz.

Filter/gain control module 340 comprises any device or devices configured to perform complex low pass filtering and gain control on the complex IF signal 322. In operation, the filter/gain control module 340 performs anti-aliasing on the complex IF signal 322 received from the down-converter 330, adjusts the gain of the anti-aliased signal, and transmits a gain-adjusted signal 324 to the analog-to-digital converter module 350. According to a preferred embodiment of the invention, the filter/gain control module 340 comprises a conventional 10th order Butterworth complex low-pass filter with a 9 MHz cut-off corner to perform anti-aliasing. The conventional 10th order Butterworth complex low-pass filter of the filter/gain control module 340 is discussed further below in conjunction with FIG. 4A. As is known to one skilled in the art, the 10th order Butterworth complex low-pass filter utilizes 10 stages, with each stage determining one pole of the complex low-pass filter. The filter/gain control module 340 may comprise any device that performs gain control on the anti-aliased signal and adjusts the gain as a function of a specified parameter.

In some embodiments, the analog-to-digital converter module 350 comprises two analog-to-digital converters (ADCs). The analog-to-digital converter module 350 preferably comprise two 11-bit pipeline ADCs configured to receive the gain-adjusted signal 324 and convert in-phase and quadrature-phase components of the gain-adjusted signal 324. In one embodiment, the analog-to-digital converter module 350 generates low IF digital signals 326, 327, and 328. In this embodiment, the low IF digital signal 326 is an in-phase signal (I), the low IF digital signal 327 is a quadrature signal (jQ), and the low IF digital signal 328 is an inverted quadrature signal (−jQ). Further, in this embodiment, the low IF digital signal 326 is composed of a low IF digital signal 326A, which includes a signal component and an image leakage, and a low IF digital signal 326B, which includes an image component and a signal leakage.

FIG. 3B illustrates the signal processing section 304 of the tuner 300. As illustrated, the complex LMS image rejection module 355 receives the low IF digital signals 326, 327, and 328 from the analog-to-digital converter module 350 (FIG. 3A). The complex LMS image rejection module 355 reduces image leakage in a signal band of the complex IF digital signals 326A and 327 to generate an image rejected low IF signal 331. Additionally, the complex LMS image rejection module 355 reduces signal leakage in an image band of the IF digital signals 326B and 328 to generate a signal rejected low IF signal 332. The complex LMS image rejection module 355 is discussed further below in conjunction with FIG. 4B and FIG. 7.

In one embodiment, a complex digital signal channel select filter 360 receives the image rejected low IF signal 331 and performs channel selection and filtering on the image rejected low IF signal 331 to generate a digital channel signal 333, as is described more fully herein. In another embodiment, the complex digital signal channel select filter 360 receives the signal rejected low IF signal 332 and performs channel selection and filtering on the signal rejected low IF signal 332 to generate the digital channel signal 333, as is also described more fully herein.

The complex digital channel select filter 360 provides the digital channel signal 333 to the comparator module 370 and the demodulator 365. In exemplary embodiments, the demodulator 365 demodulates the digital channel signal 333 to generate a digital audio mono signal 336, a digital sound IF (SIF) signal 337, and a digital composite video baseband (CVB) signal 338. The DAC module 375 converts the digital audio mono signal 336 to an analog audio mono signal 339, the digital SIF signal to an analog SIF signal 341, and the digital CVB signal 338 to an analog CVB signal 342, as is also described more fully herein.

The comparator module 370 receives the digital channel signal 333 and a predefined threshold signal 343 from a conventional signal generator (not shown), compares the digital channel signal 333 with the predefined threshold signal 343, and generates control signals 344 and 346. In one embodiment, the control signals 344 and 346 are automatic gain control signals (AGC), as would be appreciated by one skilled in the art. The control signals 344 and 346 are transmitted to the amplifier 315 and filter/gain control module 340, respectively, to digitally control gain of the amplifier 315 and the filter/gain control module 340.

Figure 4A:
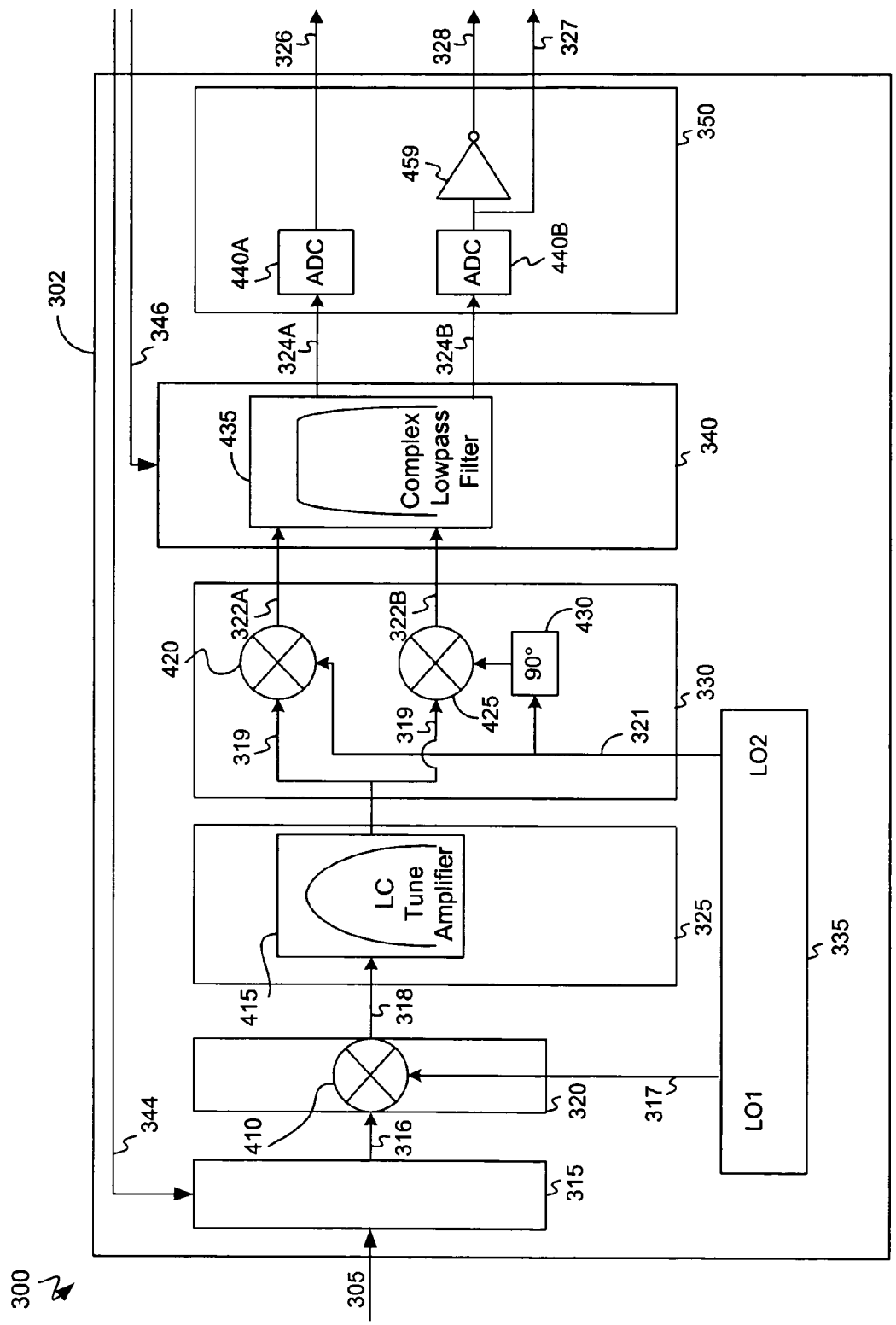
FIG. 4A illustrates an architecture diagram of the analog RF section of the tuner illustrated in FIG. 3A, according to one embodiment of the present invention.

FIG. 4A illustrates an architecture diagram of the analog RF section 302 of the tuner 300 illustrated in FIG. 3A, according to a preferred embodiment of the invention. Various other embodiments of the invention may utilize different circuit architectures. The analog RF section 302 is configured to process the RF input signal 305. Although the analog RF section 302 filters image and the signal components of the RF input signal 305, the RF analog module 302 does not remove the image leakage component from the RF input signal 305. As illustrated in FIG. 4A, the amplifier 315 receives and amplifies the RF input signal 305, and sends the amplified signal 316 to a mixer 410. The mixer 410 mixes the amplified signal 316 from the amplifier 315 with a signal 317 from a first local oscillator (LO1) of the synthesizer 335. The amplified signal 316 preferably comprises a signal with frequency from 48 MHz to 860 MHz. The mixer 410 preferably provides a signal 318 of frequency 1.0 GHz to an inductor-capacitor (LC) tune amplifier 415.

An LC tune amplifier 415 suppresses harmonics in the signal 318 received from the mixer 410 to generate a signal 319 (i.e., signals 319A and 319B). Additionally, the LC tune amplifier 415 passes the signal 319A to a mixer 420 and the signal 319B to a mixer 425. The mixer 420 mixes the signal 319A received from the LC tune amplifier 415 with a signal 321 from a second oscillator (LO2) of the synthesizer 335 to produce a signal 322A and provides the signal 322A to a complex lowpass filter 435 of a filter/gain control module 340. In addition, the mixer 425 mixes the signal 319B received from the LC tune amplifier 415 with the signal 321 from the second oscillator LO2 after the LO2 signal 321 has passed through a 90 degree phase shifter 430 to produce a signal 322B. The mixer 425 provides the signal 322B to the complex lowpass filter 435 of the filter/gain control module 340. In one embodiment, the mixer 420 and the mixer 425 are configured to produce the signals 322A and 322B with a frequency of 1.75 MHz (i.e., a low IF signal). It is to be appreciated that the signal 322A is an in-phase signal component of the complex signal 322 and the signal 322B is a quadrature signal component of the complex signal 322.

The complex lowpass filter 435 of the preferred embodiment comprises a conventional 10th order Butterworth lowpass complex filter with a cutoff frequency of 9 MHz, an exemplary embodiment of which is implemented by Jan Crols and Michiel Steyaert as disclosed in "An Analog Integrated Polyphase Filter For A High Performance Low-IF Receiver," Symposium on VLSI Circuits, pp 87-88, 1995, which is incorporated herein by reference. The complex lowpass filter 435 is configured to perform anti-aliasing on the signals 322A and 322B received from the mixer 420 and the mixer 425. In one embodiment, the filter/gain control module 340 further comprises a gain control module (not shown) that processes the anti-aliased signal produced by the complex lowpass filter 435 and compensates for possible gain variation along the signal line.

Figure 4B:
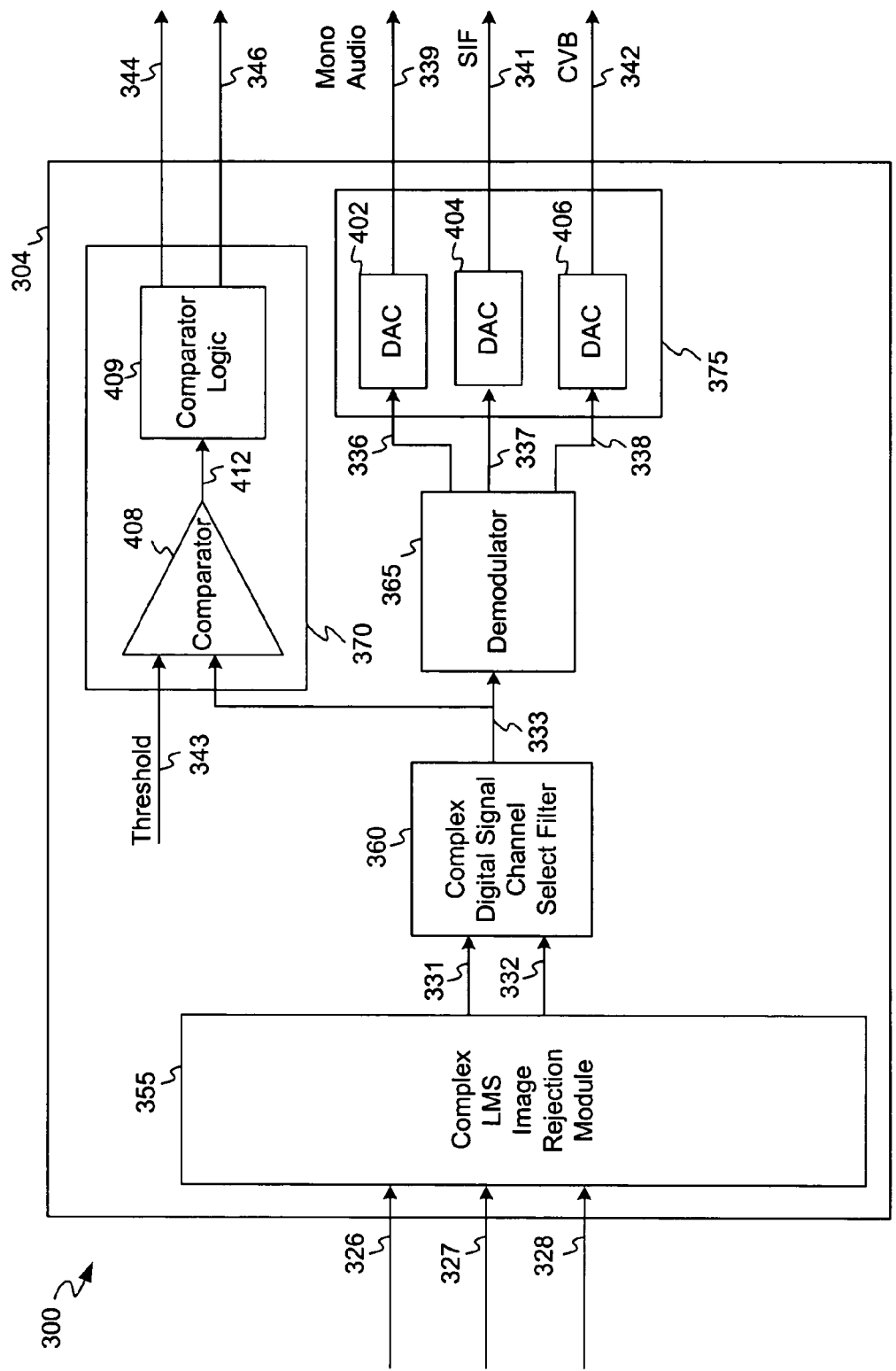
FIG. 4B illustrates an architecture diagram of the signal processing section of the tuner illustrated in FIG. 3B, according to one embodiment of the present invention.

In one embodiment, the filter/gain control module 340 performs anti-aliasing on the signal 322A to produce a signal 324A and provides the signal 324A to an analog-to-digital converter (ADC) 440A of the analog-to-digital converter module 350. Additionally, the filter-gain control module 340 performs anti-aliasing on the signal 322B to produce a signal 324B and provides the signal 324B to an ADC 440B of the analog-to-digital converter module 350. In this embodiment, the signals 324A and 324B are components of the gain-adjusted signal 324. In an exemplary embodiment, the ADC 440A and the ADC 440B each comprise an 11-bit pipeline ADC. The ADC 440A converts the signal 324A (e.g., an in-phase signal) into a low IF digital signal 326, which includes the signals 326A and 326B, and provides the low IF digital signal 326 to the complex LMS image rejection module 355 (FIG. 4B). The ADC 440B converts the signal 324B (e.g., a quadrature signal) into a digital signal 327 and provides the signal 327 to an inverter 459 and to the complex LMS image rejection module 355. The inverter 459 inverts the digital signal 327 to generate a digital signal 328 and provides the digital signal 328 to the complex LMS image rejection module 355. In one embodiment of the present invention, the signals 326A and 327 are comprised primarily of a signal component and an image leakage, and the signals 326B and 328 are comprised primarily of an image component and a signal leakage.

FIG. 4B illustrates an architecture diagram of the signal processing section 304 of tuner 300 illustrated in FIG. 3B, according to a preferred embodiment of the invention. The signal processing section 304 receives the low IF digital signals 326, 327 and 328 from the analog RF section 302, reduces the image leakage in the low IF digital signals 326A and 327 to generate the image rejected low IF signal 331, and reduces the signal leakage in the low IF digital signals 326B and 328 to generate the signal rejected low IF signal 332. In one embodiment, the signal processing section 304 selects a signal channel in the image rejected low IF signal 331 and suppresses channel components adjacent to the signal channel. In an alternative embodiment, the signal processing section 304 selects a signal channel in the signal rejected low IF signal 332 and suppresses channel components adjacent to the signal channel. In various embodiments, the signal processing section 304 shapes the selected signal channel and equalizes the group delay in the signal channel to generate the digital channel signal 333. Further, the signal processing section 304 demodulates the digital channel signal 333 to generate the digitals signals 336, 337, and 338, and converts the digital signals 336, 337, and 338 into the respective analog signals 339, 341, and 342, as is described more fully herein.

In one embodiment, the complex LMS image rejection module 355 applies the following adaptive algorithm to reduce the image leakage and the signal leakage in the low IF digital signals 326A, 326B, 327 and 328, and to generate the image rejected low IF signal 331:

$$W_1^{k+1}[m] = W_1^k[m] + \mu_1 u_2[k] u_1[k-m]$$

$$W_2^{k+1}[m] = W_2^k[m] + \mu_2 u_1[k] u_2[k-m]$$

$$m = 0 \ldots L$$

In the above algorithm, W1 is an adaptive filter coefficient for estimating image leakage, W2 is an adaptive filter coefficient for estimating signal leakage, µ1 is an LMS adjustment step size for W1, µ2 is an LMS adjustment step size for W2, u1 is a signal output, u2 is an image output, m is an mth tap of an adaptive filter, and L is a number of taps. The complex LMS image rejection module 355 is discussed further below in conjunction with FIG. 7.

In one embodiment, the complex digital signal channel select filter 360 receives the image rejected low IF signal 331 and filters the image rejected low IF signal 331 to generate the digital channel signal 333. The demodulator 365 receives the digital channel signal 333, demodulates the digital channel signal 333 to generate the digital signals 336, 337, and 338, and provides these digital signals 336, 337, and 338 to the DAC module 375. The DAC module 375 converts the digital signals 336, 337, and 338 to the respective analog signals 339, 341, and 342.

In one embodiment of the invention, the DAC module 375 comprises DACs 402, 404, and 406, as shown in FIG. 4B. In this embodiment, the DAC 402 converts the digital mono audio signal 336 to the analog audio mono signal 402, the DAC 404 converts the digital SIF signal 337 to the analog SIF signal 341, and the DAC 406 converts the digital CVB signal 338 to the analog CVB signal 342. In alternate embodiments, the DAC module 375 may comprise any number of digital-to-analog converters.

The comparator module 370 comprises a comparator 408 and a comparator logic module 409. In operation, the comparator 408 receives the digital channel signal 333 and the predefined threshold signal 343 provided by a conventional signal generator (not shown), and generates a signal 412 based upon a difference between the magnitude of the threshold signal 343 and the magnitude of the digital channel signal 333. The comparator logic module 409 receives the signal 412 and generates the control signal 344 (i.e., a low noise amplifier (LNA) control signal) and the control signal 346 (i.e., a automatic gain control (AGC) signal), based upon the signal 412. The comparator logic module 409 provides the control signal 344 to the amplifier 315 (FIG. 4A) to digitally control gain of the amplifier 315, and provides the control signal 346 to the filter/gain control module 340 (FIG. 4A) to digitally control gain of the filter/gain control module 340.

Figure 5:
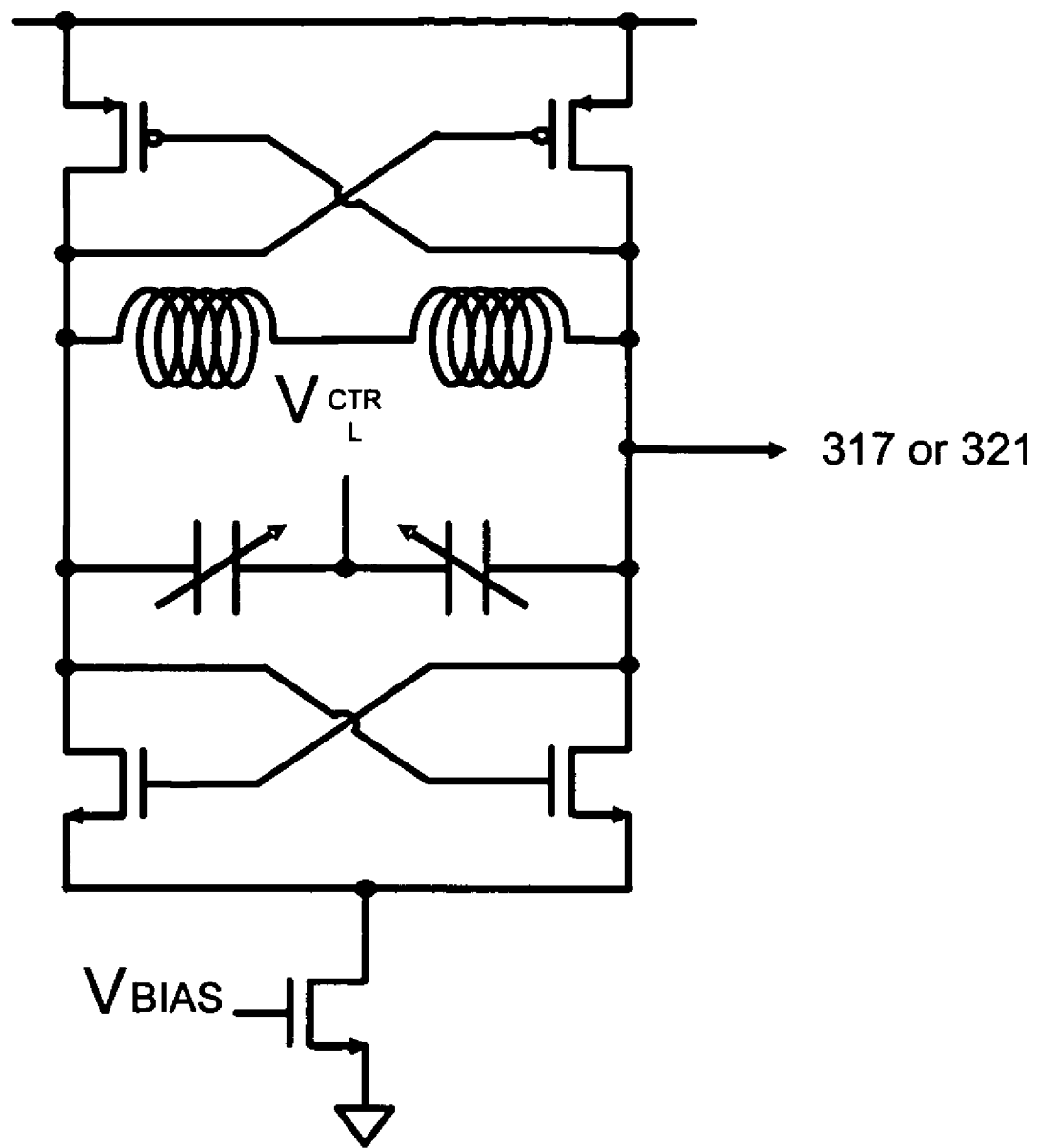
FIG. 5 illustrates a circuit diagram of the first local oscillator LO1 of the synthesizer illustrated in FIG. 4A, according to one embodiment of the present invention.

FIG. 5 illustrates a circuit diagram of an exemplary first local oscillator LO1 of the synthesizer 335 illustrated in FIG. 4A, according to the preferred embodiment of the invention. The exemplary first local oscillator LO1 covers a frequency range from 1.0 GHz to 1.9 GHz using the topology illustrated in FIG. 5. The exemplary first local oscillator LO1 advantageously comprises an LC oscillator to utilize an LC oscillator's phase noise performance. In one embodiment, three LC oscillators are utilized to increase the limited tuning range of a single LC oscillator in order to cover the desired frequency range of LO1, namely from about 1.0 GHz to 1.9 GHz, each LC oscillator covering a portion of the entire frequency range. Therefore, as an example, one LC oscillator covers the 1.0 to 1.3 GHz range, a second LC oscillator covers the 1.3 to 1.6 GHz range, and a third LC oscillator covers the 1.6 to 1.9 GHz range.

FIG. 5 also illustrates a preferred topology of an exemplary second local oscillator LO2 of the synthesizer 335, as illustrated in FIG. 4A. The exemplary second local oscillator LO2 is configured to synthesize a 1.0 GHz frequency signal. In order to generate the two phases (i.e. in-phase and quadrature-phase), the second local oscillator LO2 is configured to cover at least twice the frequency of the signal 319 received by the down-converter 330 (FIG. 4A). For example, if a frequency of the signal 319 is 1.0 GHz, the second local oscillator LO2 is configured to cover a frequency of 2.0 GHz. The second local oscillator LO2 is further configured to divide the output frequency by two, in order to generate the two phases (i.e., the in-phase and the quadrature-phase).

Figure 6:
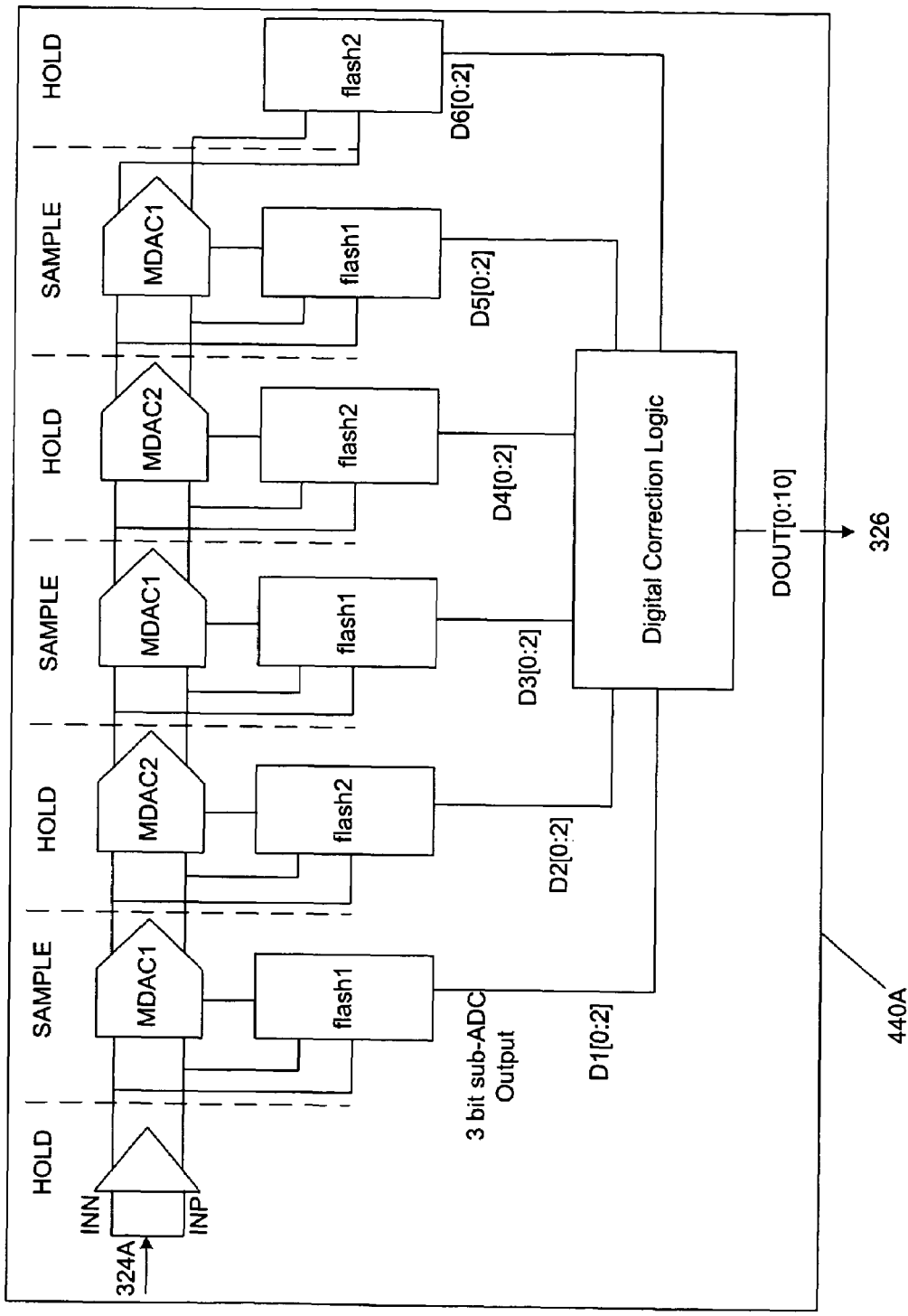
FIG. 6 illustrates a block diagram of the analog-to-digital converter illustrated in FIG. 4A, according to one embodiment of the present invention.

FIG. 6 illustrates a block diagram of the analog-to-digital converter 440A illustrated in FIG. 4A, according to one embodiment of the present invention. An exemplary analog-to-digital converter 440A is disclosed by B. S. Song, "10-b 15 MHz Recycling Two-Step A/D Converter," IEEE J. Solid-State Circuits, vol. 25, pp.1328-1337, December 1990, which is incorporated herein by reference. In this embodiment, the analog-to-digital converter 440A comprises a conventional 11-bit pipeline ADC comprising 6 stages with each stage resolving 2.5 bits, as is known to one skilled in the art. Each stage comprises a flash ADC, such as a flash1 module or a flash2 module, for coarsely converting an analog input signal to a three-bit digital output signal. In addition, each stage comprises an MDAC, such as MDAC1 or MDAC2, for receiving the analog input signal and the three-bit digital output signal, converting the three-bit digital output signal to a converted analog signal, subtracting the converted analog signal from the analog input signal to generate a difference signal, amplifying the difference signal, and sending the amplified difference signal to the next stage. The three-bit digital output signal generated by each flash ADC is transmitted to a digital correction logic module. The digital correction logic module combines the three-bit digital output signals from the flash ADCs to generate an eleven-bit output signal 326. The analog-to-digital converter 440B (FIG. 4A) is similar to the analog-to-digital converter 440A, and will not be further described.

Figure 7:
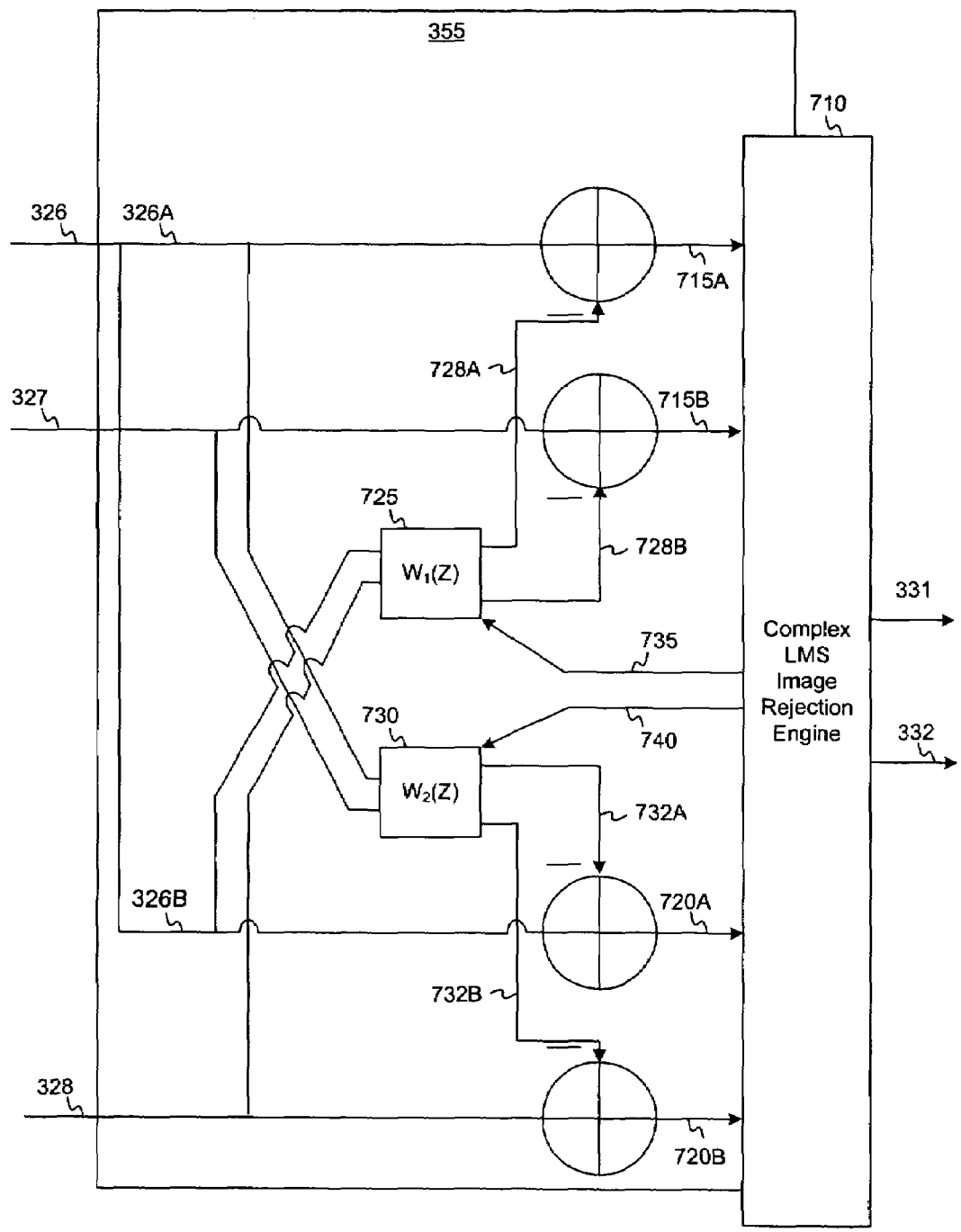
FIG. 7 illustrates a block diagram of the complex LMS image rejection module shown in FIG. 4B, according to one embodiment of the present invention.

FIG. 7 illustrates an exemplary block diagram of the complex LMS ("Least-Mean-Square") image rejection module 355, according to one embodiment of the invention. When there is mismatch along the two signal paths (i.e., I path and Q path), an image leakage appears in the signal component (also referred to as the signal band) and a signal leakage appears in the image component (also referred to as the image band). It is typical to have a phase imbalance of less than 5 degrees and gain mismatch of 0.5 dB along the two signal paths, which results in −40 dB of image leakage in the signal band or signal leakage in the image band. The complex LMS image rejection module 355 comprises a complex LMS image rejection engine 710 configured to apply a complex LMS algorithm to estimate the correlation between a signal component and an image component.

As illustrated in FIG. 7, the complex LMS image rejection module 355 receives the low IF digital signals 326A and 327, which comprise a signal component and an image leakage, and the low IF digital signals 326B and 328, which comprise an image component and a signal leakage, from the analog-to-digital converter module 350 (FIG. 3A). The complex image rejection module 355 then applies an adaptive filter coefficient 725 (i.e., $W_1$) to the signals 326B and 328 (i.e., the image component and the signal leakage) to generate an estimated image leakage 728A and an estimated image leakage 728B. The complex LMS image rejection module 355 then subtracts the estimated image leakages 728A and 728B from the respective signals 326A and 327 (i.e., the signal component and the image leakage) to generate respective signals 715A and 715B. Additionally, the complex image rejection module 355 applies an adaptive filter coefficient 730 (i.e., $W_2$) to the signal 326A and the signal 327 (i.e., the signal component and image leakage) to generate an estimated signal leakage 732A and an estimated signal leakage 732B. The complex LMS image rejection module 355 then subtracts the estimated signal leakages 732A and 732B from the respective signals 326B and 328 (i.e., the image component and the signal leakage) to generate the respective signals 720A and 720B.

The complex LMS image rejection engine 710 receives the signals 715A, 715B, 720A, and 720B, and estimates a correlation between the signals 715A and 715B and the signals 720A and 720B. The complex LMS image rejection module 355 then adjusts the adaptive filter coefficients 725 and 730 (i.e., $W_1$ and $W_2$), based on the estimated correlation, to minimize the correlation between the signal component and the image component. By minimizing the correlation between the signal component and the image component, the image leakage is reduced in the signals 715A and 715B, and the signal leakage is reduced in the signals 720A and 720B. In one embodiment, the complex LMS image rejection module 355 generates a gain control signal 735 to control the adaptive filter coefficient 725 and a gain control signal 740 to control the adaptive filter coefficient 730.

In one embodiment, the complex LMS image rejection module 355 outputs the signals 715A and 715B as the image rejected low IF signal 331, which comprises a signal component and a reduced image leakage. In another embodiment, the complex LMS image rejection module 355 outputs the signals 720A and 720B as the signal rejected low IF signal 332, which comprises an image component and a reduced signal leakage. In still another embodiment, the complex LMS image rejection module 355 in conjunction with the analog-to-digital converter module 350 (FIG. 4A) separates the RF input signal 305 (FIG. 4A) into image and signal components, reduces image leakage in the signal component, and reduces the signal leakage in the image component to generate both the image rejected low IF signal 331 and the signal rejected low IF signal 332 substantially free from image leakage and signal leakage.

In one embodiment, the complex LMS image rejection module 355 is configured to apply the following algorithm to calculate the adaptive filter coefficients 725 and 730 (i.e., $W_1$ and $W_2$):

$$W_1^{k+1}[m] = W_1^k[m] + \mu_1 u_2[k] u_1[k-m]$$

$$W_2^{k+1}[m] = W_2^k[m] + \mu_2 u_1[k] u_2[k-m]$$

$$m = 0 \ldots L$$

In the above algorithm, $W_1$ is the adaptive filter coefficient 725 for the estimated signal leakage, $W_2$ is the adaptive filter coefficient 730 for the estimated image leakage, $\mu 1$ is the LMS adjustment step size for $W_1$, $\mu 2$ is the LMS adjustment step size for $W_2$, u1 is the signal component output (i.e., the image rejected low IF signal 331), u2 is the image component output (i.e., the signal rejected low IF signal 332), m is the mth tap of the adaptive filter 725 or 730, and L is a number of taps in the adaptive filter 725 or 730.

Figure 8:
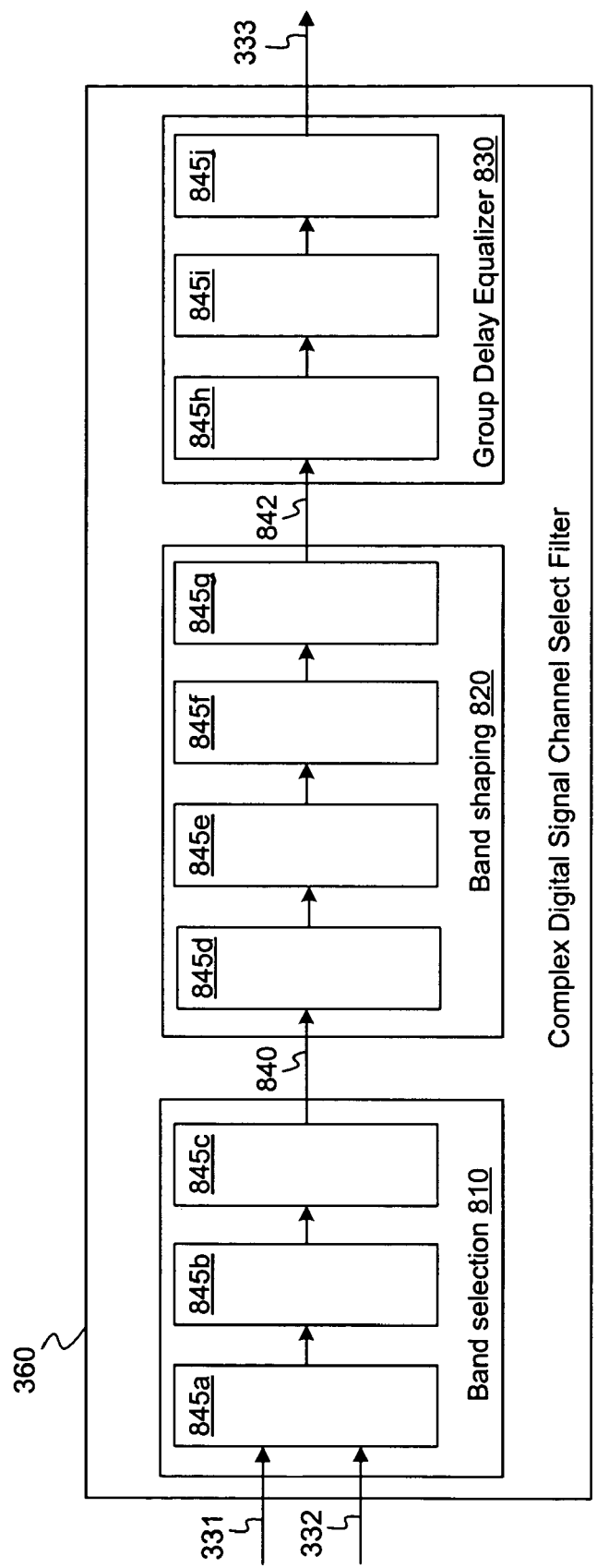
FIG. 8 illustrates a block diagram of the complex digital signal channel select filter illustrated in FIG. 4B, according to one embodiment of the present invention.

FIG. 8 illustrates a block diagram of the complex digital signal channel select filter 360 shown in FIG. 4B, according to one embodiment of the present invention. The complex digital signal channel select filter 360 comprises a band selection module 810, a band shaping module 820, and a group delay equalizer 830. In operation, the complex digital signal channel select filter 360 receives the image rejected low IF signal 331, selects a signal channel and suppresses the channel components adjacent to the signal channel, shapes the selected signal channel, and equalizes a group delay of the selected signal channel. Transfer characteristics and design of the complex digital signal channel select filter 360 is discussed below with respect to FIG. 10.

In one embodiment, the band selection module 810 receives the image rejected low IF signal 331 from the complex LMS image rejection module 355 (FIG. 7) and generates a selected signal band signal 840. In this embodiment, the band selection module 810 selects a signal channel (i.e., a signal band) of the image rejected low IF signal 331 and suppresses (i.e., filters out) the channel components adjacent to the selected signal channel by using one or more biquadratic sections 845 (i.e., second order sections) of a filter. Although the band selection module 810 depicted in FIG. 8 comprises three cascaded biquadratic sections 845a-845c, it is to be appreciated that the band selection module 810 can comprise any number of cascaded biquadratic sections 845. The biquadratic sections 845 are further discussed below in conjunction with FIG. 9.

The band selection module 810 outputs the selected signal band signal 840 to the band shaping module 820. The band shaping module 820 shapes the selected signal channel in the selected signal band signal 840 to generate a shaped signal band signal 842. As discussed further below in conjunction with FIG. 13A, in one embodiment of the present invention the band shaping module 820 rounds a lower frequency edge of the selected signal band such that the selected signal band amplitude measured at 1.75 MHz is 6.0 dB down from a maximum amplitude. In one embodiment, the band shaping module 820 includes a filter comprising cascaded biquadratic sections 845 that shape the selected signal channel in the selected signal band signal 840. Although the band shaping module 820 depicted in FIG. 8 comprises four cascaded biquadatic sections 845d-845g, it is to be appreciated that the band shaping module 820 can have any number of biquadratic sections 845. The band shaping module 820 provides the shaped signal band 842 to the group delay equalizer 830.

The group delay equalizer 830 receives the shaped signal band signal 842 and equalizes a group delay of the shaped selected signal channel in the shaped signal band signal 842 to generate a digital channel signal 333. In one embodiment of the present invention, the group delay equalizer 830 comprises a filter including three cascaded biquadratic sections 845h-845j. The group delay equalizer 830 outputs the digital channel signal 333 to the demodulator 365 (FIG. 4B) and the comparator module 370 (FIG. 4B). Accordingly, as illustrated, the complex digital signal channel select filter 360 receives the image rejected low IF signal 331, selects a signal channel in the image rejected low IF signal 331, suppresses the channels adjacent to the selected signal channel, shapes the selected signal channel, and equalizes a group delay of the shaped selected signal channel to generate the digital channel signal 333 comprising the equalized shaped selected signal channel. In one embodiment of the present invention, the biquadratic sections 845a-845j are second-order biquadratic filters utilizing a Direct Form II transposed IIR (Infinite Impedance Impulse Response), as described further below in conjunction with FIG. 9.

Although the band shaping module 820 follows the band selection module 810, and the group delay equalizer 830 follows the band shaping module 820 in the exemplary complex digital signal channel select filter 360 of FIG. 8, it is to be appreciated that the band selection module 810, band shaping module 820, and group delay equalizer 830 may be ordered differently in various embodiments. For example, the group delay equalizer 830 can follow the band shaping module 820, and the band selection module 810, can follow the group delay equalizer 830. It is further to be appreciated that each of the band selection module 810, band shaping module 820, and group delay equalizer 830 may have any number of biquadratic sections 845 in various embodiments.

Figure 9:
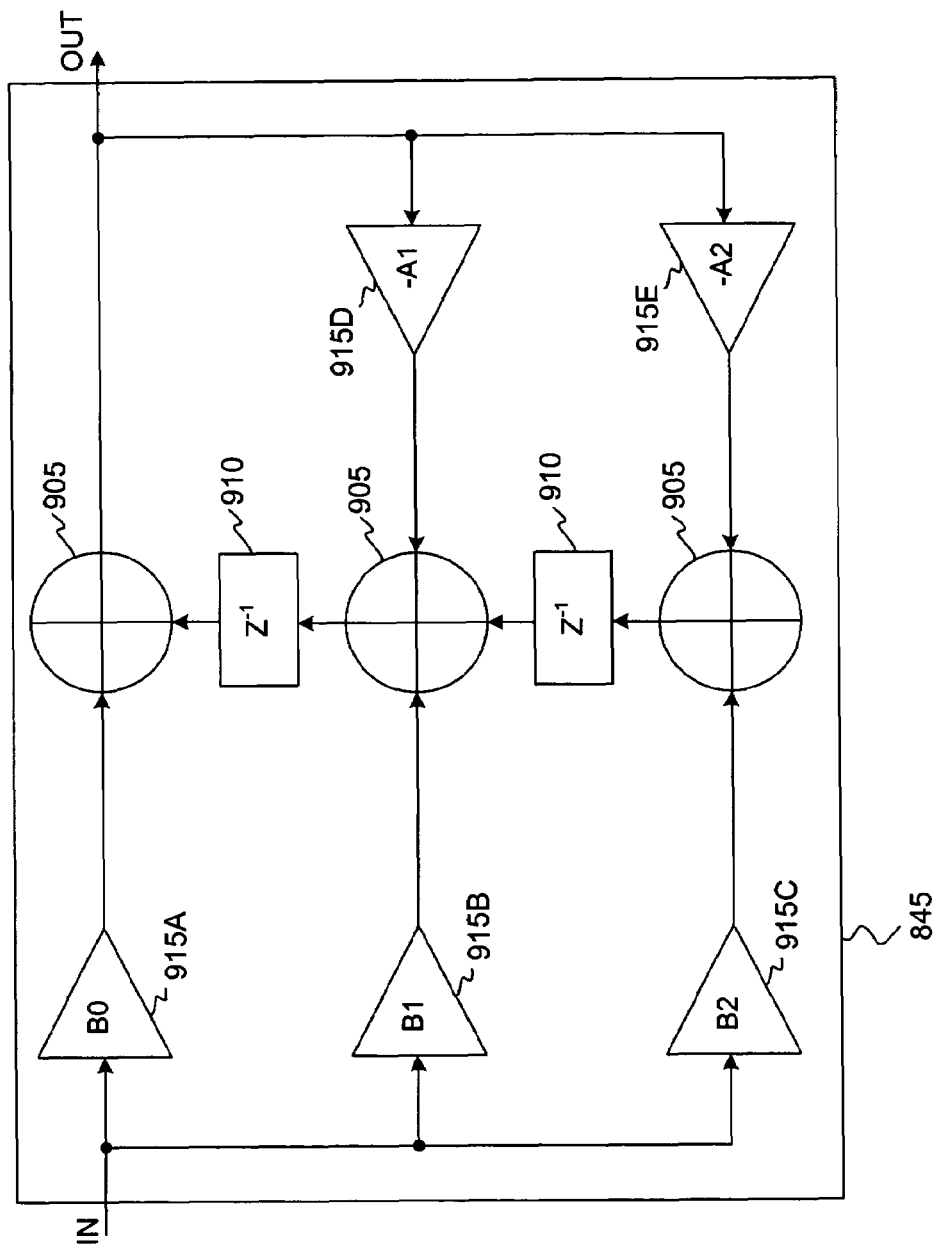
FIG. 9 is a block diagram of the second-order biquadratic filter illustrated in FIG. 8, according to one embodiment of the present invention.

FIG. 9 illustrates one embodiment of the second-order biquadratic filter 845 shown in FIG. 8, according to the present invention. The second-order biquadratic filter 845 is disclosed by Alan V. Openheim and Ronald W. Schafer, Digital Signal Processing, Prentice Hall, Eagle-Wood, 1974, comprises a plurality of summers 905, delay modules 910, and amplifiers 915 for signal scaling, which is incorporated herein by reference. The signal response of the second-order biquadratic filter 845 is represented by the following transfer function:

$$H_{BQ}(z) = \frac{B0 + B1 \cdot z^{-1} + B2 \cdot z^{-2}}{1 + A1 \cdot z^{-1} + A2 \cdot z^{-2}}$$

where B0, B1, and B2 are feed-forward filter coefficients, A1 and A2 are feedback filter coefficients, and $z^{-n}$ is a delay element of order n.

Exemplary filter coefficients for the biquadratic sections 845a-c of the band selection module 810, in accordance with one embodiment, are provided in respective Tables 1-3.

TABLE 1

| Coefficient | Value |
| --- | --- |
| B0 | 1 |
| B1 | −0.437664 − 0.587855i |
| B2 | −0.286803 + 0.95799i |
| A1 | −0.746340 − 1.002510i |
| A2 | −0.214201 + 0.715481i |

TABLE 2

| Coefficient | Value |
| --- | --- |
| B0 | 1 |
| B1 | −0.086338 − 0.115972i |
| B2 | −0.286803 + 0.95799i |
| A1 | −0.546002 − 0.733407i |
| A2 | −0.105633 + 0.352840i |

TABLE 3

| Coefficient | Value |
| --- | --- |
| B0 | 1 |
| B1 | 0.408478 + 0.548681i |
| B2 | −0.286803 + 0.95799i |
| A1 | −0.409499 − 0.550053i |
| A2 | −0.039814 + 0.132989i |

Exemplary filter coefficients for the biquadratic sections 845d-g of the band shaping module 820, in accordance with one embodiment, are provided in respective Tables 4-7.

TABLE 4

| Coefficient | Value |
| --- | --- |
| B0 | 1 |
| B1 | 0.5162 |
| B2 | 0.0666 |
| A1 | −0.8638 |
| A2 | 0.4428 |

TABLE 5

| Coefficient | Value |
| --- | --- |
| B0 | 1 |
| B1 | −1.9966 |
| B2 | 1.0000 |
| A1 | −1.4557 |
| A2 | 0.06617 |

TABLE 6

| Coefficient | Value |
| --- | --- |
| B0 | 1 |
| B1 | 0.4612 |
| B2 | 1.0000 |
| A1 | −0.5340 |
| A2 | 0.7885 |

TABLE 7

| Coefficient | Value |
| --- | --- |
| B0 | 1 |
| B1 | −0.2230 |
| B2 | −0.9216 |
| A1 | −0.0935 |
| A2 | 0.9045 |

Exemplary filter coefficients for the biquadratic sections 845h-j of the group delay equalizer 830, in accordance with one embodiment, are depicted in respective Tables 8-10.

TABLE 8

| Coefficient | Value |
| --- | --- |
| B0 | 1 |
| B1 | −2.3267 |
| B2 | 1.8492 |
| A1 | −1.2582 |
| A2 | 0.5408 |

TABLE 9

| Coefficient | Value |
| --- | --- |
| B0 | 1 |
| B1 | −1.4003 |
| B2 | 1.5360 |
| A1 | −0.9117 |
| A2 | 0.6510 |

TABLE 10

| Coefficient | Value |
| --- | --- |
| B0 | 1 |
| B1 | −0.2077 |
| B2 | 1.0851 |
| A1 | −0.1914 |
| A2 | 0.9216 |

Figure 10:
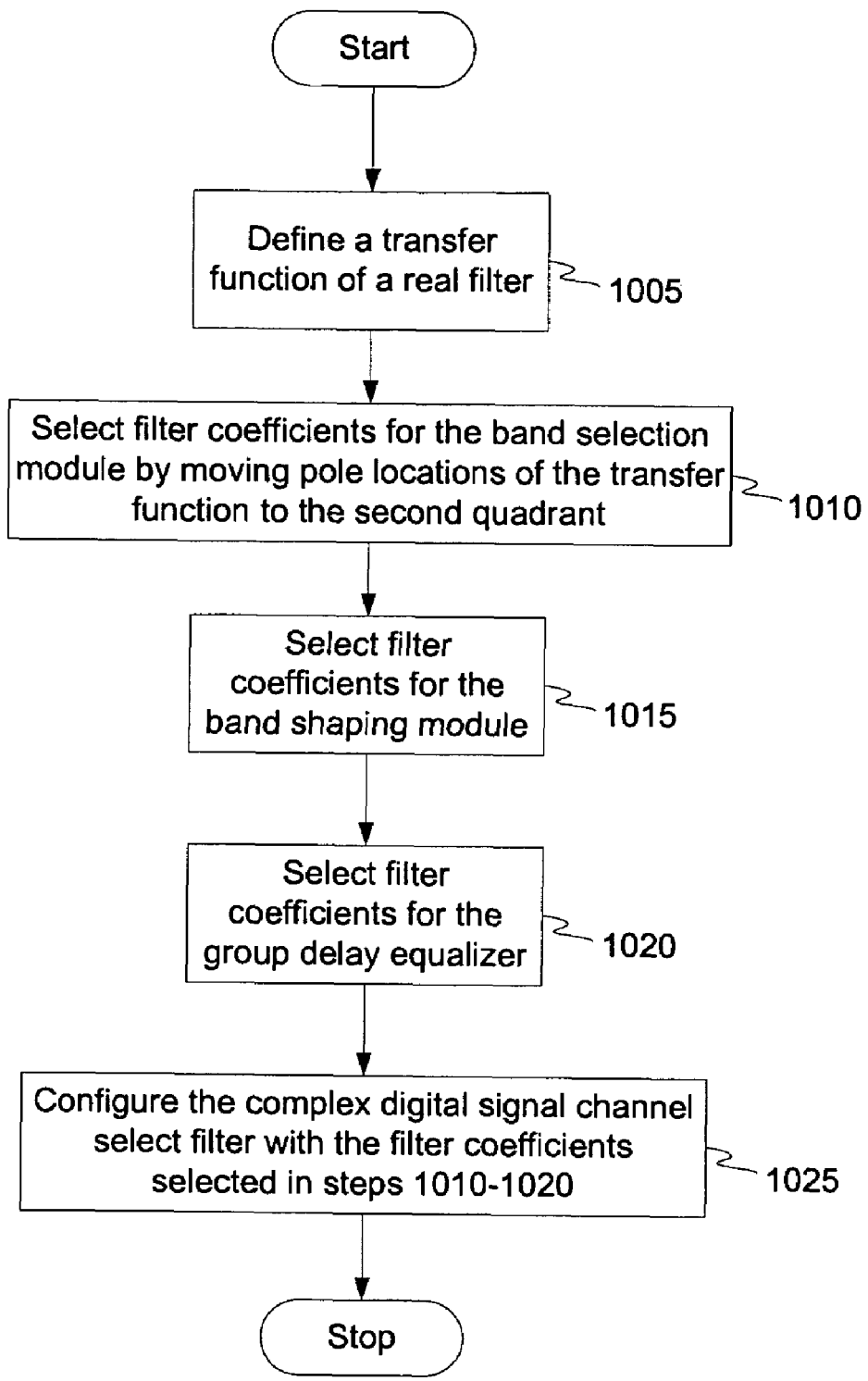
FIG. 10 is a flowchart of method steps for designing the complex digital signal channel select filter illustrated in FIG. 8, according to one embodiment of the present invention.
Figure 11A:
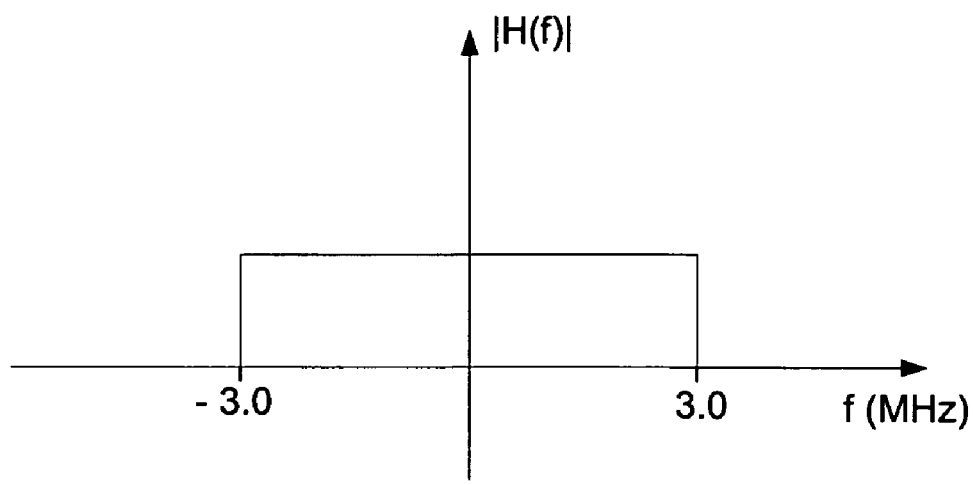
FIG. 11A illustrates a transfer function magnitude |H(f)| of a real low-pass filter with a bandwidth of 6.0 MHz, according to one embodiment of the present invention.
Figure 11B:
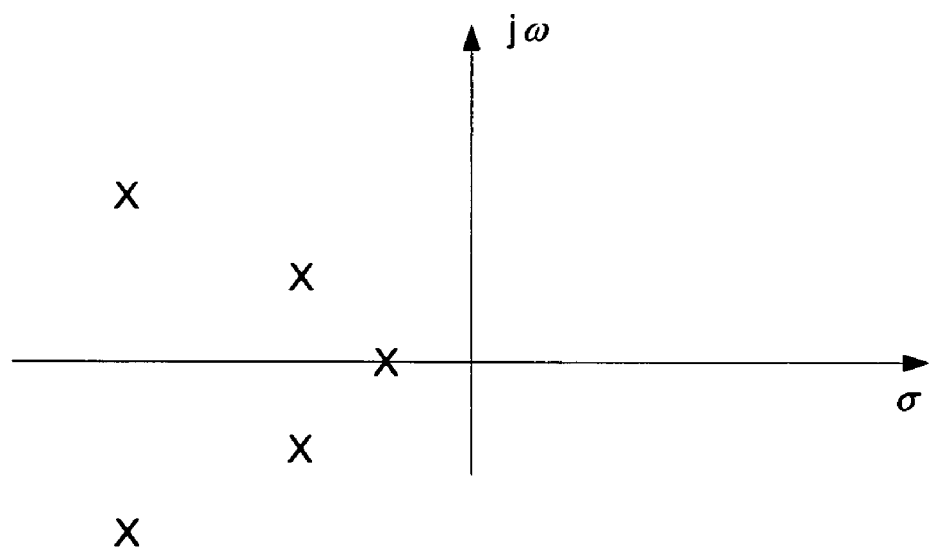
FIG. 11B is a plot of pole locations of the FIG. 1A transfer function in the complex frequency plane ($\sigma$, $j\omega$), according to the present invention.

FIG. 10 is a flowchart of method steps for designing the complex digital signal channel select filter 360 illustrated in FIG. 8, according to one embodiment of the present invention. The complex digital signal channel select filter 360 may be designed by moving locations of one or more poles in the complex-frequency plane of a real low-pass filter transfer function (i.e., modifying one or more filter coefficients corresponding to a real low-pass filter). For example, in step 1005, filter designers define a transfer function of a real filter. As an exemplary embodiment of step 1005, FIG. 11A illustrates a transfer function magnitude |H(f)| of a real low-pass filter with a bandwidth of 6.0 Mhz, and FIG. 11B is a plot of pole locations of the FIG. 11A transfer function in the complex frequency plane (σ, jω). In accordance with the scope of the present invention, the filter designers may, in step 1005, select any transfer function associated with a real filter that has poles in the second and third quadrants of the complex frequency plane. For example, the designers may initially select a transfer function of a real bandpass filter.

Figure 12A:
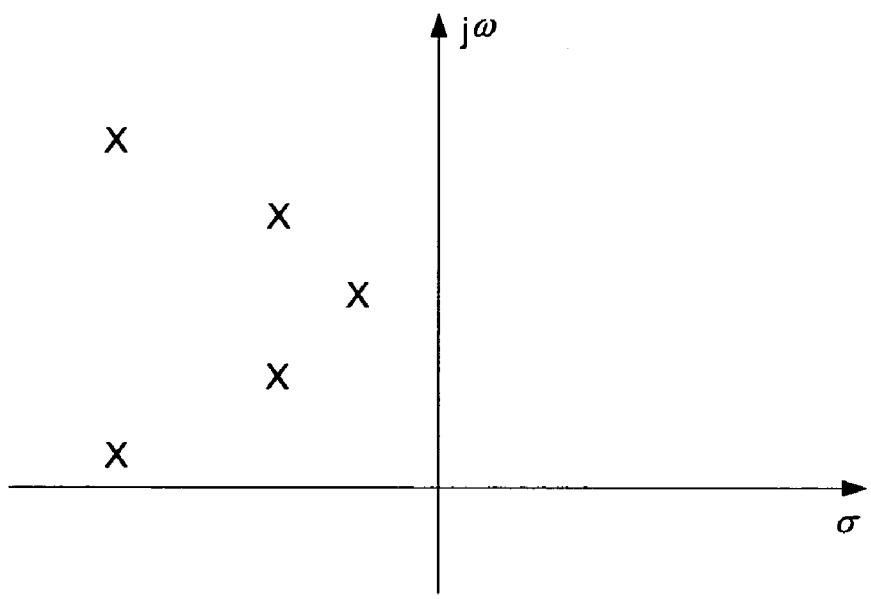
FIG. 12A illustrates new pole locations in the complex frequency plane as a result of shifting the pole locations illustrated in FIG. 11B.
Figure 12B:
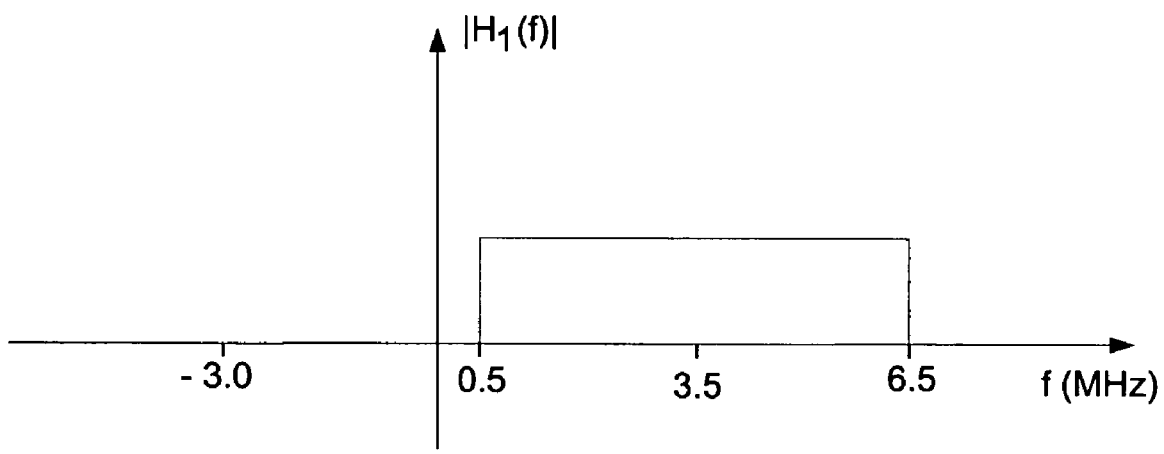
FIG. 12B illustrates magnitude of the transfer function $H_1(f)$ corresponding to the FIG. 12A pole locations.

Next, in step 1010, the filter designers move the pole locations to the second quadrant of the complex frequency plane to convert the real filter to a complex filter. As an exemplary embodiment of step 1010, FIG. 12A illustrates the shifted pole locations in the complex frequency plane, and FIG. 12B illustrates an associated transfer function magnitude $|H_1(f)|$. In one embodiment of the present invention, the 6.0 MHz bandwidth transfer function $|H(f)|$, centered about f=0 as illustrated in FIG. 11A, is shifted to a center frequency of 3.5 MHz as illustrated in FIG. 12B. By shifting the poles locations such that all poles are located in the second quadrant, the transfer function $|H_1(f)|$ represents a complex filter configured to process the image rejected low IF signal 331 (FIG. 8). In one embodiment of the present invention, the filter designers select values for the filter coefficients (i.e., filter coefficients B0, B1, B2, −A1, and −A2 as shown in FIG. 9) of the biquadratic sections 845a-845c (FIG. 8) of the band selection module 810 (FIG. 8) to generate the transfer function $|H_1(f)|$. That is, frequency response of the band selection module 810 (FIG. 8) is defined by the transfer function $|H_1(f)|$.

Figure 13A:
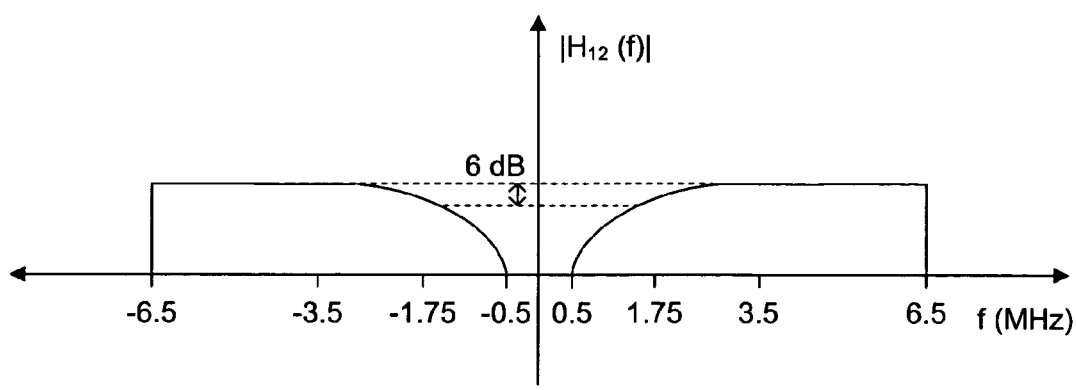
FIG. 13A illustrates magnitude of the collective transfer function $H_{12}(f)$ of the band selection module and the band shaping module, according to one embodiment of the present invention.
Figure 13B:
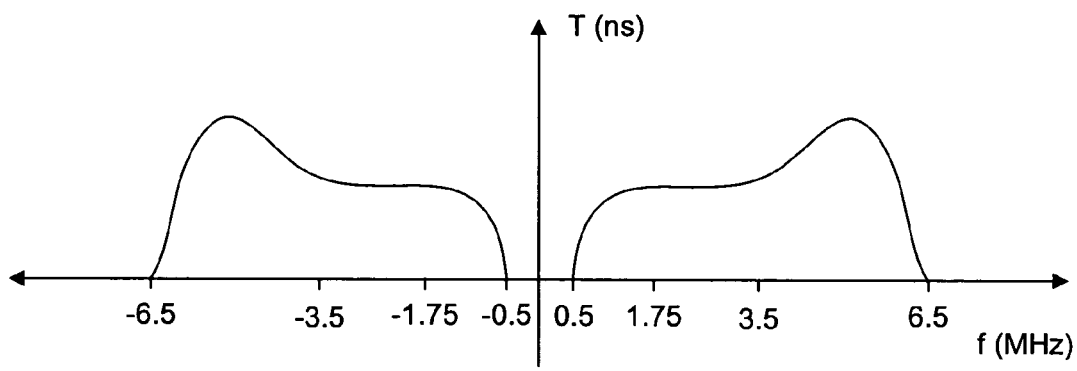
FIG. 13B illustrates phase of the collective transfer function $H_{12}(f)$, according to one embodiment of the present invention.

In step 1015, the filter designers select values for the filter coefficients of the biquadratic filters 845d-845g (FIG. 8) of the band shaping module 820 (FIG. 8) such that a collective transfer function $H_{12}(f)$ of the band selection module 810 and the band shaping module 820 selects and shapes a signal channel according to design specifications. As an exemplary embodiment of step 1015, FIG. 13A illustrates the transfer function magnitude $|H_{12}(f)|$, in accordance with the present invention. As illustrated in FIG. 13A, the transfer function $|H_{12}(f)|$ preferably passes (i.e., selects) a 6.0 MHz positive bandwidth signal channel centered at 3.5 MHz, with a 6.0 dB decrease in signal channel amplitude at a frequency of 1.75 MHz and a 6.0 MHz negative bandwidth signal channel centered at −3.5 MHz with a 6.0 dB decrease in signal amplitude at a frequency of −1.75 MHz (i.e., the shaped signal band 842 of FIG. 8). FIG. 13B illustrates the phase of the collective transfer function $H_{12}(f)$, expressed as a time delay of the frequency components of the selected signal channel. Since the phase of the collective transfer function $H_{12}(f)$ is nonlinear, the shaped signal band 842 (FIG. 8) is sent to the group delay equalizer 830 (FIG. 8) to equalize the group delay (i.e., to linearize the time delay of the frequency components of the selected signal channel).

Figure 14:
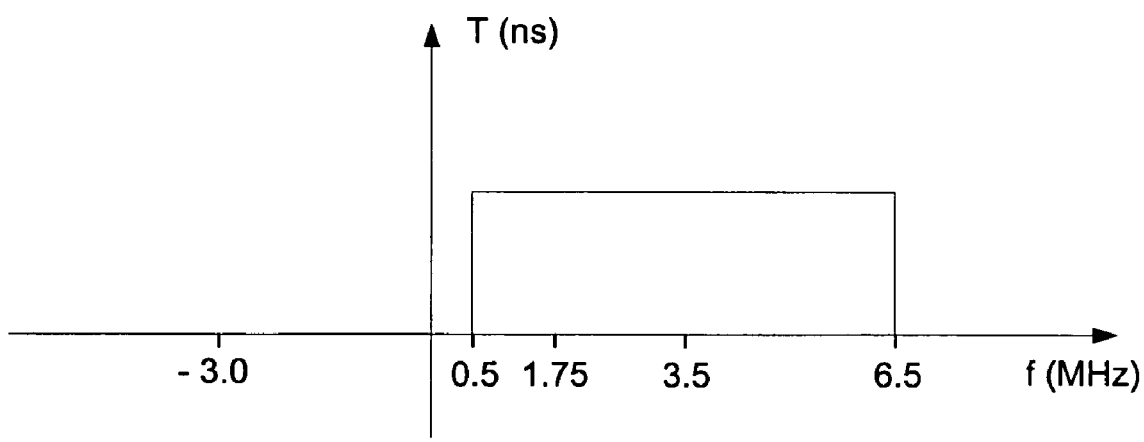
FIG. 14 illustrates phase of the collective transfer function $H_{123}(f)$ of the band selection module, the band shaping module, and the group delay equalizer, in accordance with one embodiment of the present invention.

Next, in step 1020, the filter designers select values for the filter coefficients of the biquadratic filters 845h-845j (FIG. 8) of the group delay equalizer 830 such that the collective transfer function $H_{123}(f)$ of the band selection module 810, the band shaping module 820, and the group delay equalizer 830 selects and shapes the designated signal channel, and linearizes the time delays of the frequency components of the selected signal channel. As an exemplary embodiment of step 1020, FIG. 14 illustrates a phase of the collective transfer function $H_{123}(f)$ expressed as a time delay of the frequency components of the selected signal channel, in accordance with the present invention. Since the time delay is approximately constant as a function of frequency, the phase of the collective transfer function $H_{123}(f)$ is approximately a linear function of frequency.

In step 1025, the filter designers configure the complex digital signal channel select filter 360 (FIG. 8) with the filter coefficients determined or selected in method steps 1010-1020.

Figure 15:
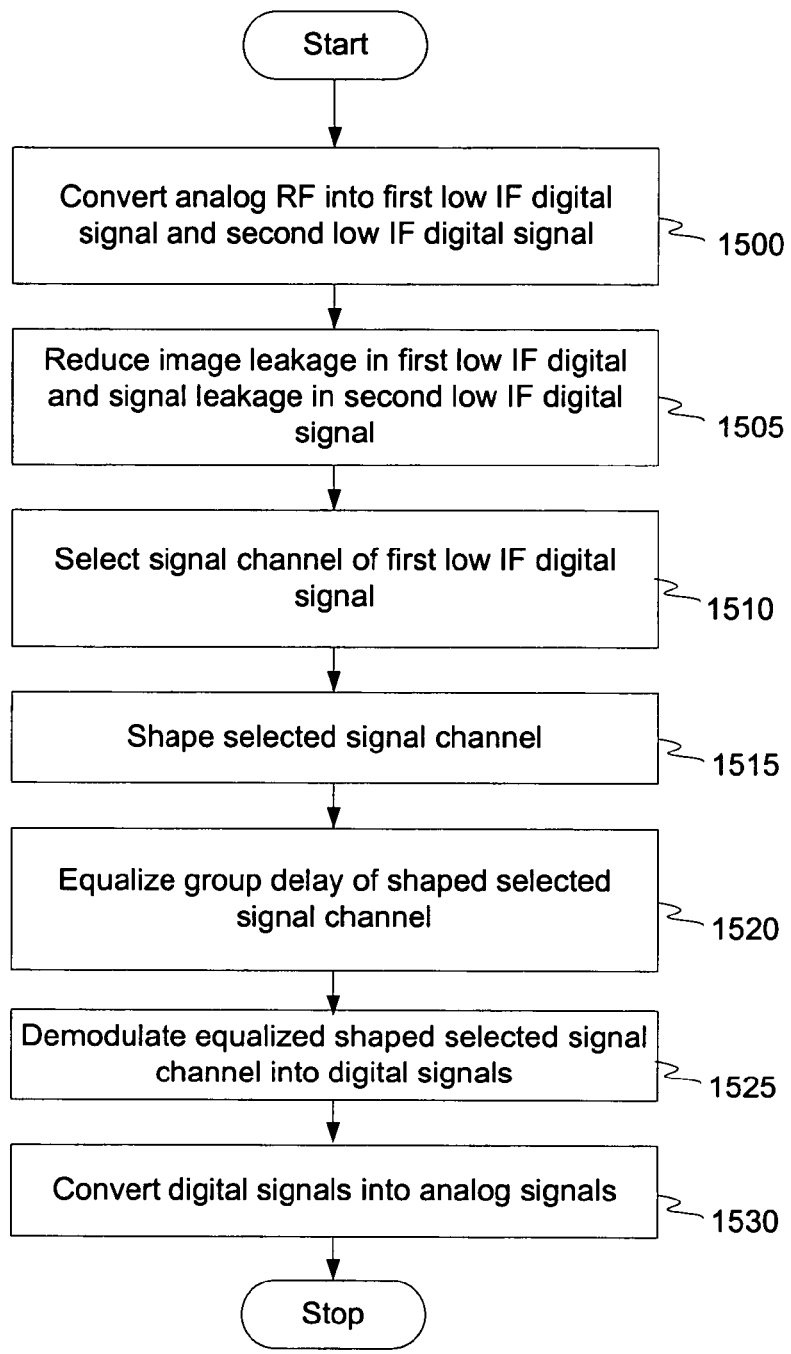
FIG. 15 is a flowchart of a method for selecting a signal channel in a radio frequency signal, in accordance with one embodiment of the present invention.

FIG. 15 is a flowchart of a method for selecting a signal channel in a radio frequency signal, in accordance with one embodiment of the present invention. In step 1500, an analog RF input signal 305 is converted into a first low IF digital signal and a second low IF digital signal. In one embodiment, the first low IF digital signal comprises the low IF digital signals 326A and 327, and the second low IF digital signal comprises the low IF digital signals 326B and 328. In this embodiment, the first low IF signal is substantially comprised of a signal component and an image leakage, and the second low IF signal is comprised substantially of an image component and a signal leakage.

In step 1505, a complex LMS image rejection module 355 reduces image leakage in the first low IF digital signal (e.g., the low IF digital signals 326A and 327), and reduces signal leakage in the second low IF digital signal (e.g., the low IF digital signals 326B and 328). In one embodiment, the complex LMS image rejection module 355 uses an adaptive algorithm to reduce the image leakage in the first low IF digital signal and reduce the signal leakage in the second low IF digital signal by minimizing the correlation between the first low IF digital signal and the second low IF digital signal.

In another embodiment, the complex image rejection module 355 applies the adaptive filter coefficient 730 (i.e., $W_2$) to the first low IF digital signal (i.e., signals 326A and 327) to generate the estimated signal leakages 732A and 732B, and applies the adaptive filter coefficient 725 (i.e., $W_1$) to the second low IF digital signal (i.e., signals 326B and 328) to generate the estimated image leakages 728A and 728B. The complex LMS image rejection module 355 subtracts the estimated image leakages 728A and 728B from the respective signals 326B and 328 (i.e., the first low IF digital signal) to generate signals 715A and 715B, which comprise an estimated image rejected low IF signal. Additionally, the complex LMS image rejection module 355 subtracts the estimated signal leakage 732A and 732B from the signals 326B and 328 (i.e., the second low IF digital signal) to generate the signals 720A and 720B, which comprise an estimated signal rejected low IF signal. The complex LMS image rejection module 355 then adjusts the adaptive filter coefficients 725 and 730 to minimize correlation between the estimated image rejected low IF signal and the estimated signal rejected low IF digital signal, and outputs the estimated image rejected low IF signal as the image rejected low IF signal 331.

In step 1510, the band selection module 810 of the complex digital signal channel select filter 360 selects a signal channel of the image rejected low IF signal 331 to generate the selected signal band signal 840. In one embodiment, the band selection module 810 also suppresses channel components adjacent to the signal channel (i.e., adjacent channel components). In another embodiment, the band selection module 810 includes a filter composed of cascaded biquadratic sections 845. In this embodiment, the biquadratic sections 845 select the signal channel of the image rejected low IF signal 331 and suppress channel components adjacent to the selected signal channel.

In step 1515, the band shaping module 820 of the complex digital channel select filter 360 receives the selected signal band signal 840 from the band selection module 810 and shapes the selected signal channel in the selected signal band signal 840 to generate the shaped signal band signal 842. In one embodiment, the band shaping module 820 includes a filter composed of cascaded biquadratic sections 845. In this embodiment, the biquadratic sections 845 shape the selected signal channel.

In step 1520, the group delay equalizer module 830 receives the shaped signal band signal 842 from the band shaping module 820 and equalizes the group delay of the shaped selected signal channel in the shaped signal band signal 842 to generate the digital channel signal 333. In one embodiment, the group delay equalizer module 830 includes a filter composed of cascaded biquadratic sections 845. In this embodiment, the biquadratic sections 845 equalize the group delay of the shaped selected signal channel.

In step 1525, the demodulator 365 demodulates the equalized shaped selected signal channel in the digital channel signal 333 to generate the digital signals 336, 337, and 338. In one embodiment, the digital signal 336 is a digital mono audio signal, the digital signal 337 is a digital SIF signal, and the digital signal 338 is a digital CVB signal, as is described more fully herein.

In step 1530, the DAC module 375 converts the digital signals 336, 337, and 338 to the respective analog signals 339, 341, and 342. In one embodiment, the analog signal 339 is an analog mono audio signal, the analog signal 341 is an analog SIF signal, and the analog signal 342 is an analog CVB signal.

The present invention has been described above with reference to exemplary embodiments. Other embodiments will be apparent to those skilled in the art in light of this disclosure. The present invention may readily be implemented using configurations other than those described in the exemplary embodiments above. Therefore, these and other variations upon the exemplary embodiments are covered by the present invention.

What is claimed is:

1. A system for selecting a signal channel of a radio frequency signal, comprising:
   an analog RF section configured to process an analog RF input signal to generate a first low IF digital signal and a second low IF digital signal, the first low IF digital signal substantially comprising a signal component and an image leakage, the second low IF digital signal comprising an image component and signal leakage; and
   a signal processing section comprising a complex LMS image rejection module and a complex digital signal channel select filter, the complex LMS image rejection module configured to reduce the image leakage in the first low IF digital signal and reduce the signal leakage in the second low IF digital signal, the complex digital signal channel select filter comprising a band selection module configured to select a signal channel of the first low IF digital signal and suppress channel components adjacent to the selected signal channel.

2. The system of claim 1, wherein the band selection module comprises a filter including at least one biquadratic section.

3. The system of claim 1, wherein the complex digital signal channel select filter further comprises a band shaping module configured to shape the selected signal channel.

4. The system of claim 1, wherein the complex digital signal channel select filter further comprises a group delay equalizer configured to equalize a group delay of the selected signal channel.

5. The system of claim 1, wherein the complex digital signal channel select filter is further configured to shape the selected signal channel and equalize a group delay of the selected signal channel.

6. The system of claim 1, wherein the complex digital signal channel select filter comprises a transfer function having poles located only in a second quadrant of a complex frequency plane.

7. The system of claim 1, wherein the analog RF section and the signal processing section are integrated on a semiconductor chip.

8. A method for selecting a signal channel of a radio frequency signal, comprising:
   processing an analog RF input signal to generate a first low IF digital signal and a second low IF digital signal, the first low IF digital signal substantially comprising a signal component and an image leakage, the second low IF digital signal substantially comprising an image component and a signal leakage;
   reducing the image leakage in the first low IF digital signal and reducing the signal leakage in the second low IF digital signal;
   filtering the first low IF digital signal to select a signal channel; and
   performing complex digital filtering to suppress channel components adjacent to the signal channel.

9. The method of claim 8, wherein filtering the first low IF digital signal to select the signal channel further comprises shaping the selected signal channel.

10. The method of claim 8, wherein filtering the low IF digital signal to select the signal channel further comprises equalizing a group delay of the selected signal channel.

11. The method of claim 8, wherein filtering the low IF digital signal to select the signal channel further comprises using a filter transfer function having poles located only in a second quadrant of a complex frequency plane.

12. A system for selecting a signal channel for analog cable television, comprising:
   means for processing an analog RF signal to generate a first low IF digital signal and a second low IF digital signal, the first low IF digital signal substantially comprising a signal component and an image leakage, the second low IF digital signal substantially comprising an image component and a signal leakage;
   means for reducing the image leakage in the first low IF digital signal and reducing the signal leakage in the second low IF digital signal;
   means for filtering the first low IF digital signal to select a signal channel; and
   means for performing complex digital filtering to suppress channel components adjacent to the signal channel.

13. The system of claim 12, wherein the means for filtering the first low IF digital signal to select the signal channel comprises means for shaping the selected signal channel.

14. The system of claim 12, wherein the means for filtering the first low IF digital signal to select the signal channel comprises means for equalizing a group delay of the selected signal channel.

15. The system of claim 12, wherein the means for filtering the first low IF digital signal to select the signal channel further comprises means for processing the first low IF digital signal by using a filter transfer function having poles located only in a second quadrant of a complex frequency plane.

16. A method for selecting a signal channel of a radio frequency signal, comprising:
   receiving a first complex low IF digital signal comprising a signal component and an image leakage;
   receiving a second complex low IF digital signal comprising an image component and a signal leakage;
   determining an estimated signal leakage based on the first complex low IF digital signal;
   determining an estimated image leakage based on the second complex low IF digital signal;
   subtracting the estimated image leakage from the first complex low IF digital signal to generate an estimated image rejected low IF signal;
   subtracting the estimated signal leakage from the second complex low IF digital signal to generate an estimated signal rejected low IF digital signal;
   minimizing correlation between the estimated image rejected low IF signal and the estimated signal rejected low IF digital signal to generate an image rejected low IF signal, the image rejected low IF signal comprising the signal component and a reduced image leakage;

filtering the image rejected low IF signal to select a signal channel and suppress any channel components adjacent to the signal channel;
shaping the selected signal channel;
equalizing a group delay of the selected signal channel; and
demodulation the selected signal channel to generate at least one RF digital signal.

17. The method of claim 16, wherein minimizing correlation between the estimated image rejected low IF signal and the estimated signal rejected low IF digital signal to generate an image rejected low IF signal comprises using an adaptive algorithm to determine the estimated signal leakage and the estimated image leakage based on the estimated image rejected low IF signal and the estimated signal rejected low IF digital signal.

* * * * *